United States Patent

Kuwana et al.

[11] Patent Number: 5,596,921
[45] Date of Patent: Jan. 28, 1997

[54] THERMALLY INSULATED COOKING DEVICE

[75] Inventors: Takeshi Kuwana; Yoshiya Nishino; Yasuhiko Komiya; Kunio Matsuda, all of Tokyo, Japan

[73] Assignee: Nippon Sanso Corporation, Tokyo, Japan

[21] Appl. No.: 640,316

[22] Filed: Apr. 30, 1996

[30] Foreign Application Priority Data

Aug. 31, 1995 [JP] Japan .................................. 7-223709

[51] Int. Cl.⁶ .......................... A47J 27/00; A47J 36/00; A45C 11/20
[52] U.S. Cl. .......................... 99/340; 99/403; 99/451; 99/DIG. 14; 206/545; 206/546; 219/725; 219/732; 219/734; 220/412; 220/902; 220/912
[58] Field of Search .......................... 99/337, 339, 340, 99/403, 410–418, 467, 451, DIG. 14; 126/369, 375–377, 390; 206/541, 544, 545, 546, 549; 220/400, 411–413, 408, 428, 522, 902, 912; 219/725–735

[56] References Cited

U.S. PATENT DOCUMENTS

| | | | |
|---|---|---|---|
| 1,331,530 | 2/1920 | Shaw | 99/403 |
| 1,625,999 | 4/1927 | Irish | 99/403 |
| 2,781,937 | 2/1957 | Piker | 220/412 |
| 3,670,918 | 6/1972 | Mitchell | 206/545 X |
| 3,811,558 | 5/1974 | Burk | 206/545 |
| 5,031,519 | 7/1991 | Toida et al. | 99/340 |
| 5,056,424 | 10/1991 | Lai | 99/340 X |
| 5,092,229 | 3/1992 | Chen | 99/403 |
| 5,116,240 | 5/1992 | Wischhusen et al. | 206/545 |
| 5,126,520 | 6/1992 | Nottingham et al. | 219/735 X |
| 5,251,542 | 10/1993 | Itoh et al. | 99/403 |
| 5,252,793 | 10/1993 | Woods | 219/734 |
| 5,322,182 | 6/1994 | Fritz | 219/725 X |

FOREIGN PATENT DOCUMENTS

| | | |
|---|---|---|
| 3188188 | 8/1961 | Japan . |
| 4-28490 | 7/1992 | Japan . |

Primary Examiner—Timothy F. Simone
Attorney, Agent, or Firm—Greenblum & Bernstein P.L.C.

[57] ABSTRACT

A thermally insulated cooking device, including an insulated container, a cooking spot suspended inside the insulated cooking container, an insulated outer lid which closes off an upper opening of the insulated container, and an inner lid for closing off an upper opening of the cooking pot. Further included is a heat retaining material that can be heated by microwaves, which is removably attached to an inner face of the insulated outer lid. By attaching the heat retaining material, after it has been heated in a microwave oven, a temperature drop inside the insulated container can be substantially and safely prevented since heat radiates from the heat retaining material into the insulated container. Moreover the heat retaining material can be safely handled.

6 Claims, 20 Drawing Sheets

THERMALLY INSULATED COOKING DEVICE

BACKGROUND OF THE INVENTION (1) Field of the Invention

The present invention relates to a thermally insulated cooking device comprising; an insulated container provided with an insulated outer lid, and a cooking pot provided with an inner lid, suspended in space inside the insulated container.

(2) Description of the Related Art

Heretofore as such a cooking device, there has been disclosed in FIG. 1 of Japanese Examined Patent Publication No. 4-28490, a thermally insulated cooking device comprising; an insulated container having an upper opening with first handgrips respectively provided on opposite sides thereof, a cooking pot having an inner lid, housed inside the insulated container so as to be freely inserted and removed, an insulated outer lid which is able to close off the upper opening, connecting portions located above the first handgrips and provided on the insulated outer lid or on the insulated container, for connecting between the inside and outside of the insulated container, and second hand grips fixed at their respective base ends to opposite sides of the cooking pot and protruding outwards through the connecting portions. With this thermally insulated cooking device, food such as stew is placed in the cooking pot, which is then closed With the inner lid, and heat applied to cook. After this, the cooking pot is suspended in space inside the insulated container, and the insulated outer lid closed, thereby keeping the cooking pot at a high temperature so that cooking can continue.

With the conventional technology thermally insulated cooking device, the cooking pot can be thermally insulated and thus kept at a high temperature so that cooking can continue. However with the insulated container, since the inside and outside are connected by the connecting portions, then there is the likelihood of a small drop in the interior temperature of the insulated container.

As a means to solve this problem, there is disclosed in FIG. 2 of Japanese Unexamined Patent Publication No. 3-188188, a heat retaining body which can be used repeatedly, having a heat retaining material which can be melted by microwaves provided inside a container formed from a heat resistant material which is transparent to microwaves. Consideration is given to placing this heat retaining body at the bottom of an insulated container, however with this arrangement there is a problem with poor safety of the heat retaining body.

SUMMARY OF THE INVENTION

It is therefore an object of the present invention to address the above problems by providing a thermally insulated cooking device incorporating; an insulated container, a cooking pot suspended in space inside the insulated container, an insulated outer lid which is able to close off an upper opening of the insulated container, and an inner lid for closing off an upper opening of the cooking pot, wherein a heat retaining material is provided with good safety and so that the heat retaining performance is not degraded.

According to a first aspect of the invention there is provided a thermally insulated cooking device comprising; an insulated container, a cooking pot suspended in space inside the insulated container, an insulated outer lid which is able to close off an upper opening of the insulated container, and an inner lid for closing off an upper opening of the cooking pot, wherein a heat retaining material which can be heated by microwaves is removably provided on an inner face of the insulated outer lid.

According to a second aspect of the invention there is provided a thermally insulated cooking device comprising; an insulated container, a cooking pot suspended in space inside the insulated container, an insulated outer lid which is able to close off an upper opening of the insulated container, and an inner lid for closing off an upper opening of the cooking pot, wherein a heat retaining material which can be heated by microwaves is removably provided on an inner face of the inner lid.

According to a third aspect of the invention there is provided a thermally insulated cooking device comprising; an insulated container, a cooking pot suspended in space inside the insulated container, an insulated outer lid which is able to close off an upper opening of the insulated container, and an inner lid for closing off an upper opening of the cooking pot, wherein a hollow region is provided in the inner lid, and a heat retaining material which can be heated by microwaves is provided in the hollow region, and the heat retaining material is heated by irradiating the inner lid with microwaves.

According to a fourth aspect of the invention there is provided a thermally insulated cooking device comprising; an insulated container with a shoulder member provided on an upper opening thereof, a cooking pot suspended in space inside the insulated container, an insulated outer lid which is able to close off the upper opening of the insulated container, and an inner lid for closing off an upper opening of the cooking pot, wherein the shoulder member is removably provided on the insulated container, and a heat retaining material which can be heated by microwaves is provided in the shoulder member, and the heat retaining material is heated by irradiating the shoulder member with microwaves.

According to a fifth aspect of the invention there is provided a thermally insulated cooking device comprising; an insulated container, a cooking pot suspended in space inside the insulated container, an insulated outer lid which is able to close off an upper opening of the insulated container, and an inner lid for closing off an upper opening of the cooking pot, wherein a recess portion is formed in a bottom portion of an inner container of the insulated container, and a heat retaining material which can be heated by microwaves is removably provided in the recess portion.

According to a sixth aspect of the invention there is provided a thermally insulated cooking device comprising; an insulated container, a cooking pot suspended in space inside the insulated container, an insulated outer lid which is able to close off an upper opening of the insulated container, and an inner lid for closing off an upper opening of the cooking pot, wherein a heat retaining material which can be heated by microwaves is removably provided at the upper opening, and the heat retaining material is heated by irradiation with microwaves.

With the construction according to the first aspect, by attaching the heat retaining material which has been heated in a microwave oven and the like, to the insulated outer lid, the heat retaining material can safely prevent a temperature drop inside the insulated container, and can also be safely attached.

With the construction according to the second aspect, by attaching the heat retaining material which has been heated in a microwave oven and the like to the inner lid, then a temperature drop inside the cooking pot can be prevented, and the heat retaining material can be safely attached.

With the construction according to the third aspect, by placing the inner lid inside a microwave oven and heating the heat retaining material, and then placing the inner lid on the cooking pot, then a temperature drop inside the cooking pot can be prevented, and the heat retaining material can be safely attached.

With the construction according to the fourth aspect, by placing the shoulder member inside a microwave oven and the like and heating the heat retaining material, and then attaching the shoulder member to the insulated container, then a temperature drop inside the insulated container can be prevented, and the heat retaining material can be safely attached.

With the construction according to the fifth aspect, by locating the heat retaining material which has been heated in a microwave oven and the like in the recess, then a temperature drop inside the insulated container can be prevented, and the heat retaining material can be safely located.

With the construction according to the sixth aspect, by heating the heat retaining material in a microwave oven and the like and then fitting to the insulated container, then a temperature drop inside the insulated container can be prevented.

Other objects, features and advantages of the invention will become apparent to those skilled in the art from the following description of the preferred embodiments of the invention, wherein reference is made to the accompanying drawings in which:

DETAILED DESCRIPTION OF THE PREFERRED EMBODIMENTS

Figure 1:
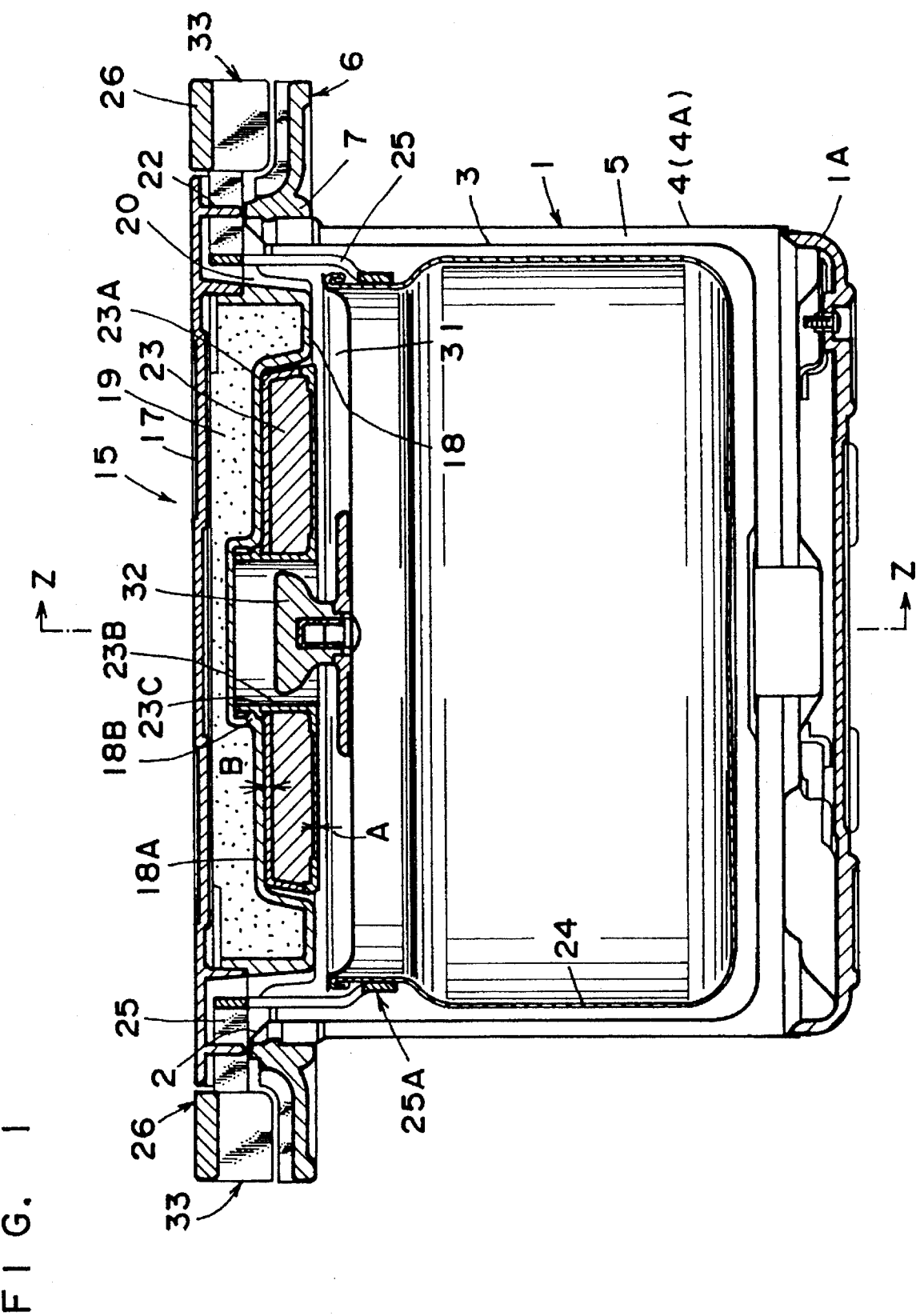
FIG. 1 is a cross-sectional view showing a first embodiment of the present invention.
Figure 2:
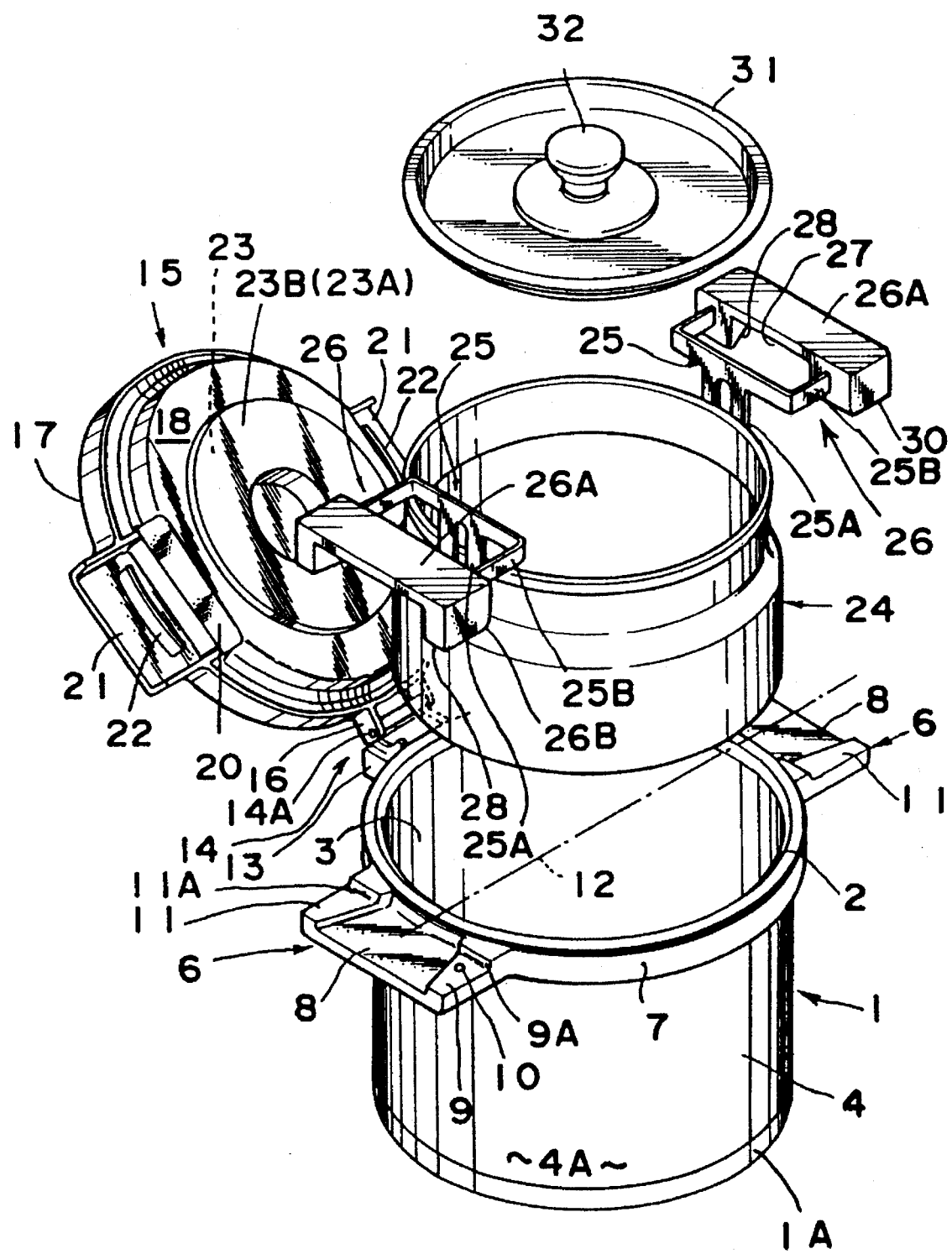
FIG. 2 is an exploded perspective view of the first embodiment.
Figure 3:
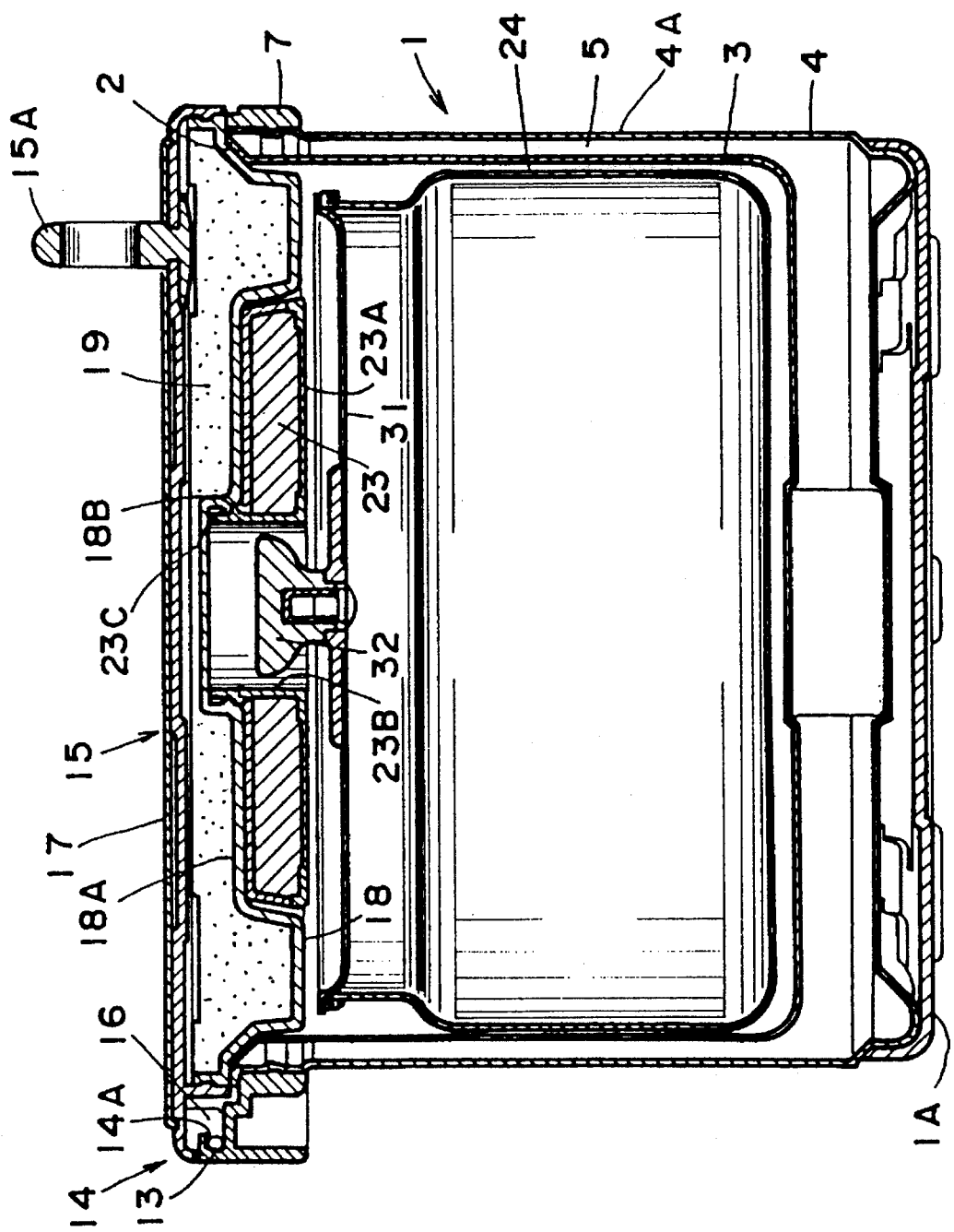
FIG. 3 is cross-sectional view on line Z—Z of FIG. 1, showing the first embodiment.
Figure 4:
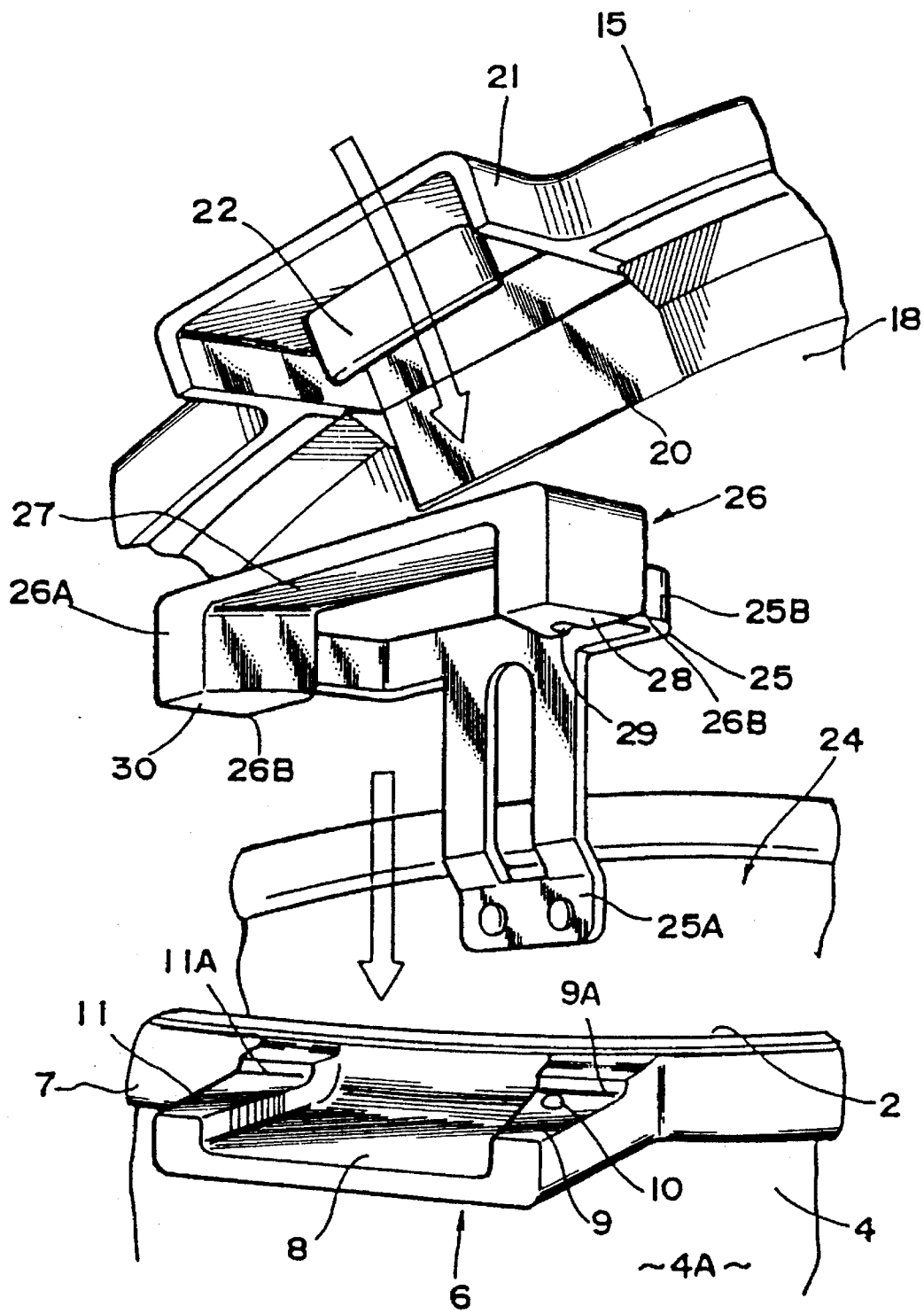
FIG. 4 is an exploded perspective view of the main components of the first embodiment.

As follows is a description of a first embodiment of the present invention with reference to FIG. 1 through FIG. 4. Numeral 1 indicates a metal insulated container. The insulated container 1 is a two layered metal vacuum container with a vacuum insulation layer 5 provided between an inner container 3 made from a metal such as stainless steel, and an outer container 4 also made from a metal such as stainless steel, joined together at an opening portion 2 (upper opening). Symbol 1A indicates a base member. Symbols 6 indicate first handgrips provided on opposite sides of an upper portion of the insulated container 1. The first handgrips 6 are integrally molded with a ring shape shoulder member 7, which is made from a synthetic resin which is forcefully engaged with an upper portion of an outer peripheral face 4A of the outer container 4. A first recess 8 is formed in an approximately central portion on an upper face of each first handgrip 6, and a protrusion 10 serving as a first engaging portion, is formed in an upper face of a flat portion 9 formed to one side of the first recess 8. Furthermore, a flat portion 11 is formed to the other side of the first recess 8. Steps 9A, 11A serving as second engaging portions, are formed on the flat portions 9, 11. The shoulder member 7 is made for example from a heat resistant resin such as a thermosetting resin. In addition, a hinge receiving portion 13 is integrally molded with the shoulder member 7 to one side of a line connecting the pair of first handgrips 6. A pivot portion 16 of an insulated outer lid 15 which closes off the opening portion 2, is pivotally connected to the hinge receiving portion 13 by means of a hinge pin 14A. The hinge receiving portion 13, the hinge pin 14A, and the pivot portion 16 constitute a hinge 14. The hinge pin 14A fitted to the pivot portion 16, is fitted so as to be freely removable from the hinge receiving portion 13. With the insulated outer lid 15, an insulation layer 19 (for example of expanded polystyrene) is provided between an upper face member 17, and a lower face member 18 which fits inside the opening portion 2. Furthermore, cutouts 20 serving as connecting portions for connecting between the inside and outside, are formed in opposite side faces of the insulated outer lid 15 so as to form a covered space above the attachment region of the first handgrips 6, and projecting portions 21 are provided to the outside of the cutouts 20. A plate shape insulating member 22 projects downward from a lower face of each projecting portion 21, avoiding the attachment arm of a second hand grip (to be described later). A fingergrip 15A is provided on the upper face of the insulated outer lid 15 on the opposite side to the hinge receiving portion 13.

Numeral 23 indicates a heat retaining material. The heat retaining material 23 made for example from polyethylene glycol, stores heat by irradiation with microwaves of for example 2450 MHz, such as produced by a microwave oven. A case 23A for containing the heat retaining material 23 is formed from a heat resistant material which is transparent to microwaves. For example, a synthetic resin such as polymethyl pentene. The case 23A is formed in a flat ring shape with a diameter smaller than that of the lower face member 18. A thickness A of the lower face is made thinner than a thickness B of the upper and side faces (A<B). Furthermore, a male threaded cylindrical portion 23C is provided on top of a central cylindrical portion 23B which accommodates a knob on the upper face of an inner lid (to be described later). A recess portion 18A is formed in the lower face member 18 so as to loosely accommodate the case 23A therein, while a female thread 18B for threaded engagement with the male threaded cylindrical portion 23C, is formed at the center of the recess portion 18A, extending in an upward direction. When the male threaded cylindrical portion 23C is threaded into the female thread 18B, the peripheral rim of the lower face member 18 and the lower face of the case 23A are arranged substantially in the same plane.

Numeral 24 indicates a cooking pot made from a metal such as stainless steel, which can be suspended in space inside the insulated container 1. The cooking pot 24 has a diameter slightly smaller than that of the inner container 3, with a shallow base, and with second handgrips 26 connected to opposite upper sides by means of attachment arms 25. The attachment arms 25 are made from a metal such as stainless steel, of an L-shape in side view. A base end 25A of each arm 25 is secured to an upper portion of the outer peripheral face of the cooking pot 24, while a tip end 25B is formed in a C-shape in plan view, so as to pass through the cutout 20 and rest on the opening portion 2. A handgrip body 26A of the second handgrip 26, which is secured to the tip end 25B of the attachment arms 25, is made from a synthetic resin. A second recessed portion 27 is formed in a lower face of the handgrip body 26A. A socket 29 serving as a first engaging portion for engaging with the protrusion 10 is formed in a first planar portion 28 formed to one side of the second recessed portion 27, while a second planar portion 30 is formed to the other side of the second recessed portion 27. A corner portion 26B serving as a second engaging portion engagable with the steps 9A, 11A, is formed in the tip end 25B side of the handgrip body 26A. The plate shape insulating member 22 is inserted from above between the tip ends 25B of the attachment arms 25 formed in a fork shape, so as to thermally insulate between the inside and outside. Numeral 31 indicates an inner lid made from a metal such as stainless steel, for closing off the upper opening of the cooking pot 24. A knob 32 is located approximately centrally on the upper face of the inner lid 31.

Next is a description of the operation using this construction. The heat retaining material 23 together with the case 23A is inserted beforehand into a microwave oven (not shown) and irradiated for a predetermined time with microwaves, so that the heat retaining material 23 is heated by the microwaves passing through the case 23A, and retains the heat. The heat retaining material 23 which has been heated in this way, is then attached by screwing the male thread cylindrical portion 23C into the female thread 18B. Meanwhile, the cooking ingredients are heated with an appropriate amount of water, or the cooking ingredients and for example water are heated separately. After heating they are put into the cooking pot 24, and the inner lid 31 closed. The cooking pot 24 is then gripped by the second handgrips 26 and placed into the insulated container 1. At this time, the attachment arms 25 rest on the opening portion 2 so that the cooking pot 24 is suspended in space, separated slightly from the inner container 3. Furthermore the corner portions 26B are respectively engaged with the steps 9A, 11A on the first handgrips 6. Also at this time, since the sockets 29 engage with the protrusions 10, then the first and second hand grips 6 and 26 can be guided and set in position. As a result, the attachment arms 25 are set in a predetermined position corresponding to the cutouts 20, with the first and second hand grips 6 and 26 overlapping each other. After this, the insulated outer lid 15 is pivoted about the hinge pin 14A and closed, and then left so that the cooking ingredients are held for a required time in a thermally insulated condition to cook. At this time, the inside and outside of the insulated container 1 and of the insulated outer lid 15 are connected by the cutouts 20, so that the insulating performance for the inside of the cooking pot 24 is degraded. However heat from the heat retaining material 23 slowly radiates from the thin bottom face of the case 23A, thus preventing a temperature drop inside the insulated container 1.

When the insulated container 1 is carried together with the cooking pot 24, then this can be carried by gripping the first handgrips 6 by hand. Moreover, when the insulated outer lid 15 is opened to lift out the cooking pot 24, the hand can be inserted into openings 33 formed between the first and second recesses 8 and 27, and the cooking pot 24 lifted out by gripping the second handgrips 26.

With the first embodiment as described above, by providing the heat retaining material 23 which is heated by microwaves in a microwave oven, on the inner face of the insulated outer lid 15 of the insulated container 1, then the temperature drop inside the insulated container 1 can be prevented so that ideal cooking can be carried out. Moreover, by containing the heat retaining material 23 in the case 23A and attaching the case 23A by the female thread 18B and the male threaded cylindrical portion 23C, then the heat retaining material 23 can be positively attached with good safety.

Furthermore, by attaching the heat retaining material 23 which has been previously heated in a microwave oven, to the inner face of the insulated outer lid 15 using the male threaded cylindrical portion 23C and the female thread 18B, the temperature drop inside the insulated container 1 can be prevented by heat radiation from the heat retaining material 23, without the heat retaining material 23 contacting the cooking pot 24. Moreover the handling of the heat retaining material 23 can be easily carried out.

With the case 23A of the heat retaining material 23, by forming the thickness A of the lower face thinner than the thickness B of the upper and side faces (A<B), then the heat radiation from the heat retaining material 23 can be concentrated at the thin lower face side.

Moreover, since the lower face of the case 23A is arranged substantially in the same plane as the peripheral rim of the lower face member 18, then there is no loss of space for housing the cooking pot 24 inside the insulated container 1.

As follows is a description of a second embodiment of the present invention. Components the same as those of the first embodiment are indicated by the same symbol and detailed description is omitted.

Figure 5:
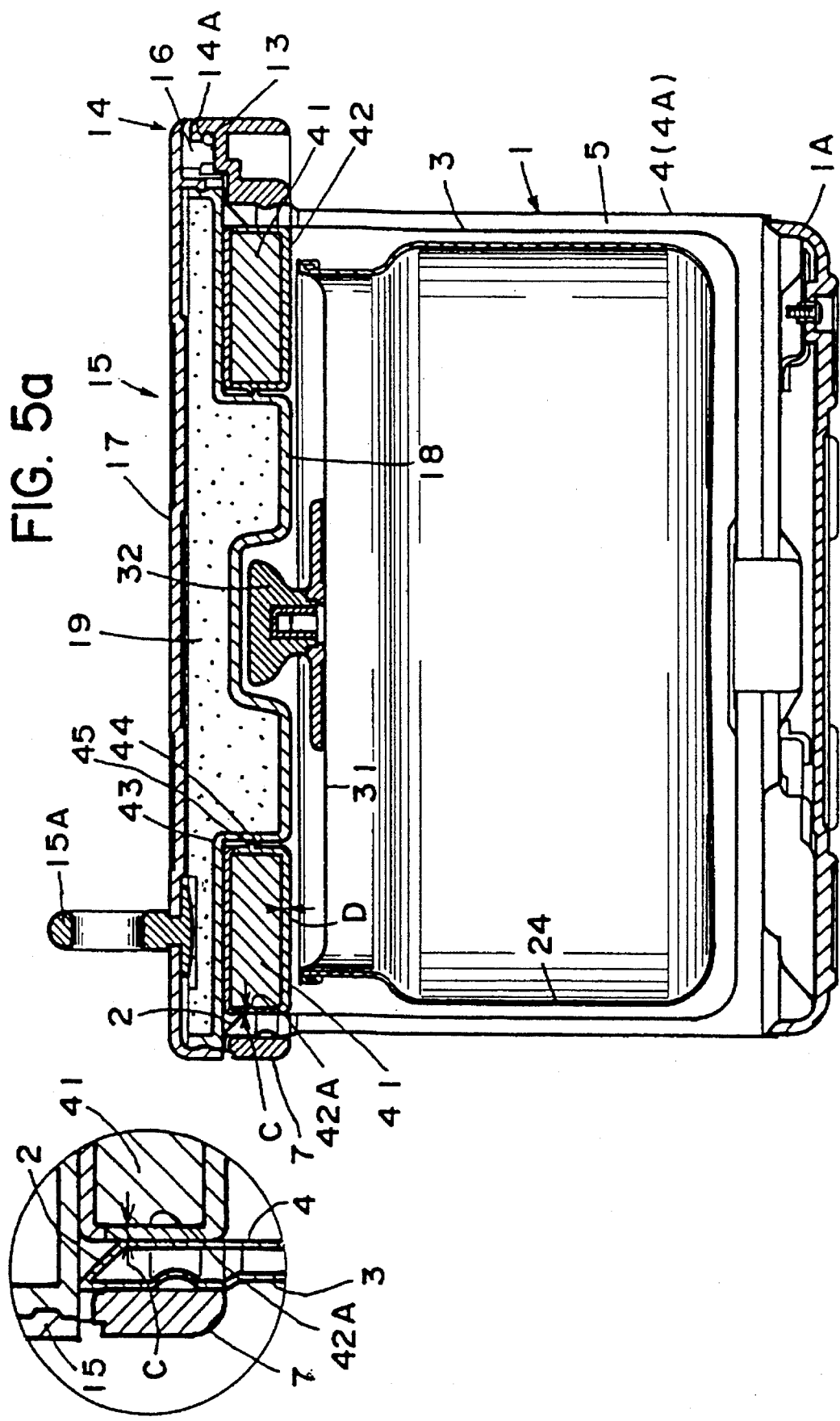
FIGS. 5a and 5b are a cross-sectional view and an enlarged portion of a cross-sectional view showing a second embodiment of the present invention.
Figure 6:
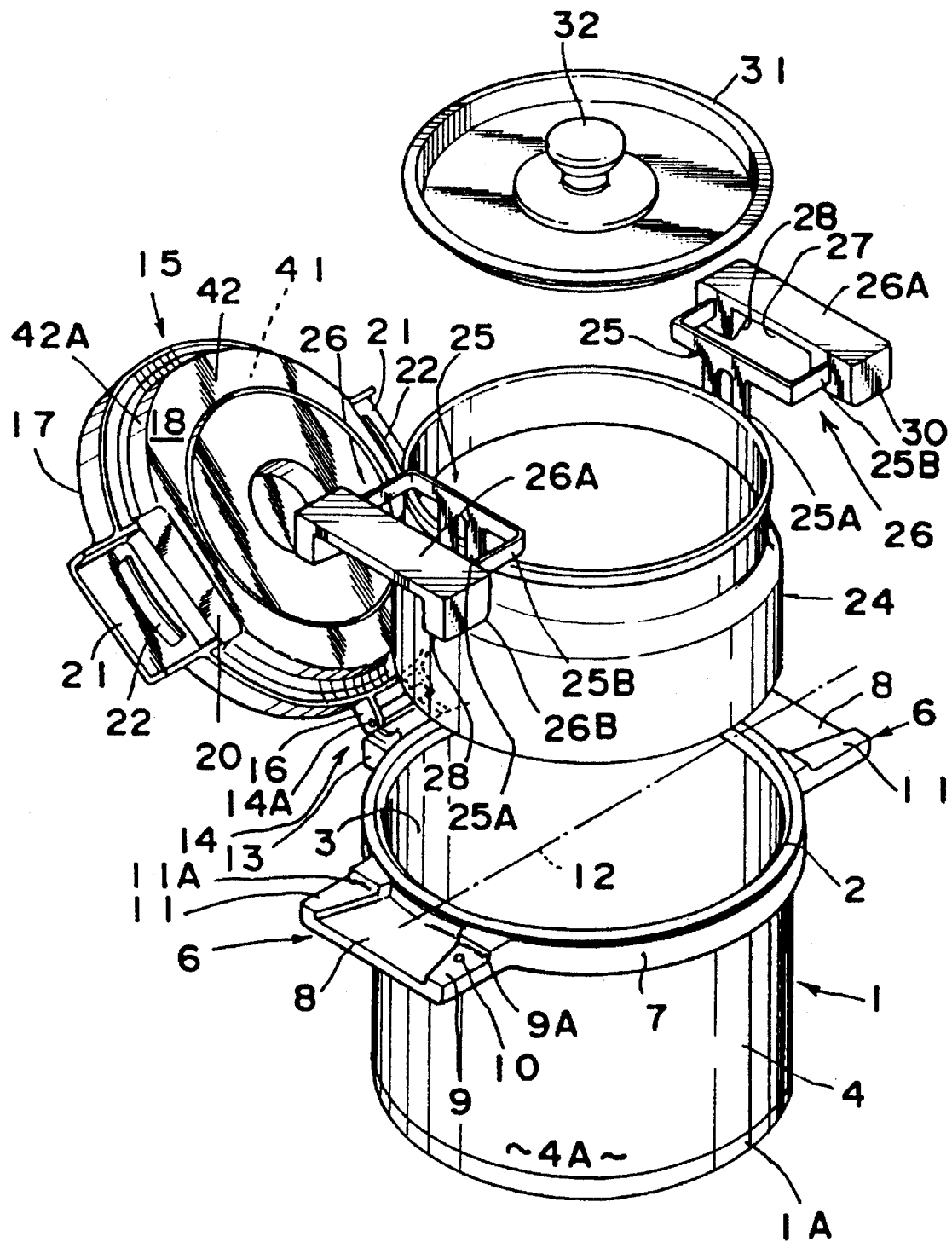
FIG. 6 is an exploded perspective view of the second embodiment.

FIGS. 5a, 5b and 6 show the second embodiment. A heat retaining material 41 is contained within a case 42, removably provided on an insulated outer lid 15. The Case 42 is formed in a ring shape with a diameter slightly smaller than that of the insulated outer lid 15, and is removably provided by having a female thread 45 formed on an inner periphery, threaded into a male thread 44 formed on a side face of a recess portion 43 formed in an outer periphery of a lower face member 18 of the insulated outer lid 15. An outer peripheral face 42A of the case 42 is made so as to contact with the inside of an opening portion 2 of an inner container 3 of an insulated container 1, when the insulated outer lid 15 is closed. Moreover, a thickness C at an outer peripheral face 42A is made thinner than a thickness D at other locations (C>D).

Consequently, in using the second embodiment, the heat retaining material 41 is preheated in a microwave oven as with the first embodiment, after which the heat retaining material 41 is attached to the insulated outer lid 15 by means of the male thread 44 and the female thread 45. By attaching the heat retaining material 41 to the inside of the insulated outer lid 15 in this way, then the temperature drop inside the insulated container 1 can be prevented by radiation from the heat retaining material 41. Moreover, since the heat retaining material 41 is enclosed within the case 42, and the case 42 is securely attached to the insulated outer lid 15 by the male thread 44 and the female thread 45, then the heat retaining material 41 can be attached with good safety.

Furthermore, since when the insulated outer lid 15 is closed, the outer peripheral face 42A of the case 42 approximately contacts the inside of the opening portion 2 of the inner container 3 of the insulated container 1, the opening portion 2 is kept at a high temperature, so that a temperature drop inside the insulated container 1 can be prevented. As a result, heat conduction via the opening portion 2 from inside the insulated container 1 to the outside can be prevented. Moreover, by making the thickness C at the outer peripheral face 42A of the case 42 thinner than the thickness D at other locations, then the heat from the heat retaining material 41 can be concentrated at the outer peripheral face 42A and conducted to the opening portion 2, so that a temperature drop occurring at the opening portion 2 can be further prevented, and the interior of the insulated container 1 thus maintained at a high temperature for a long time.

Figure 7:
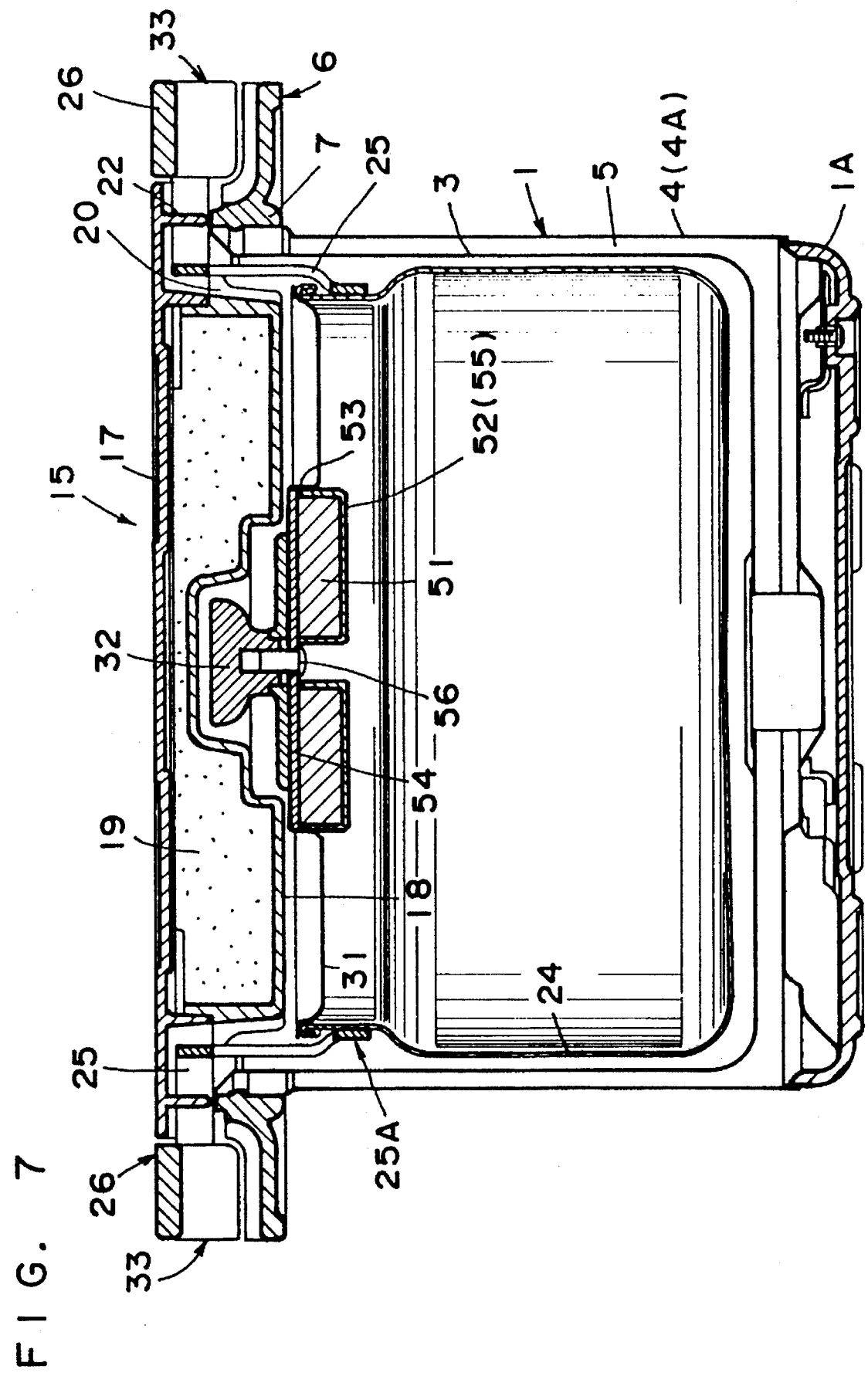
FIG. 7 is a cross-sectional view showing a third embodiment of the present invention.
Figure 8:
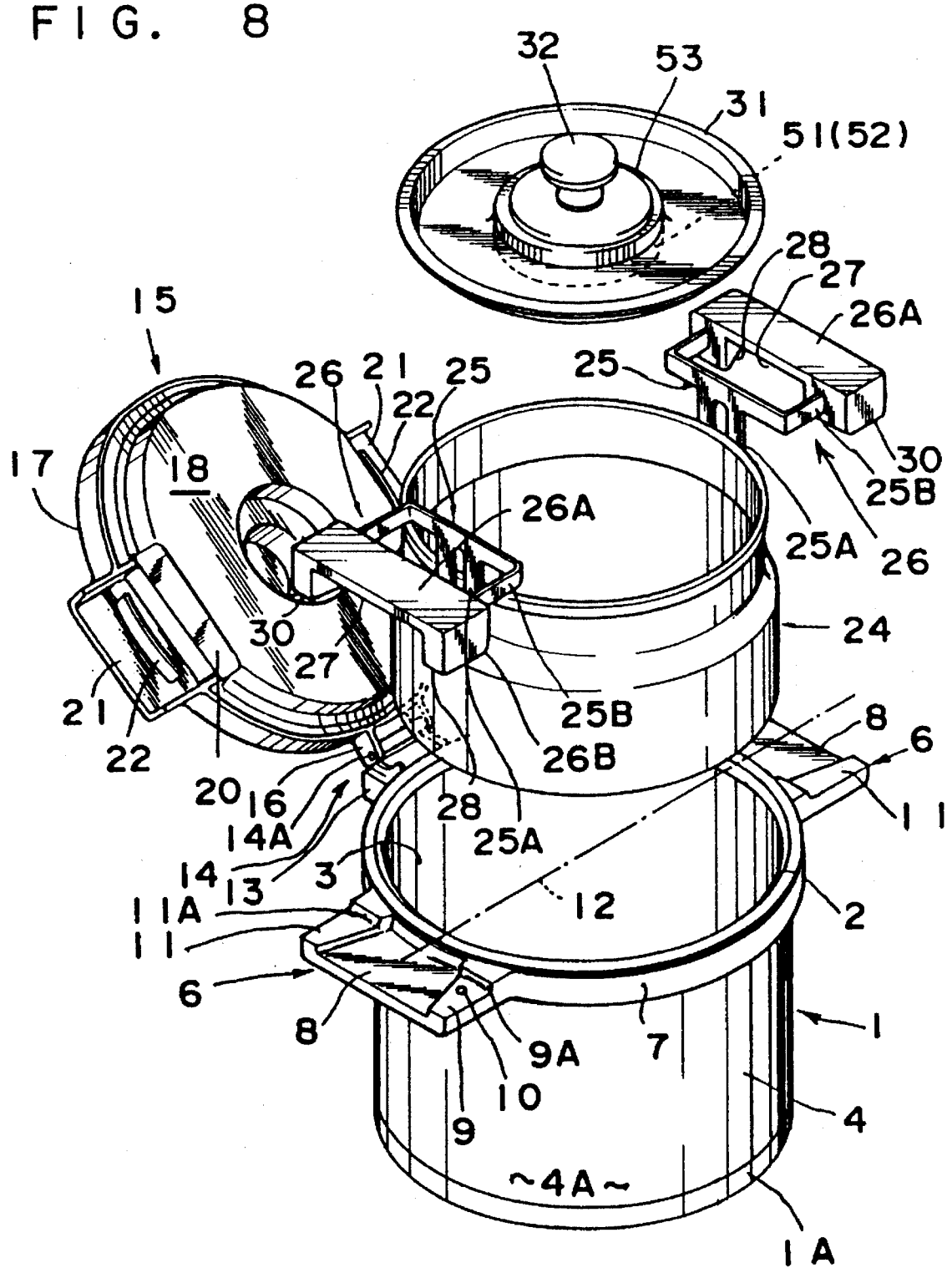
FIG. 8 is an exploded perspective view of the third embodiment.

FIGS. 7 and 8 show a third embodiment. A heat retaining material 51 is removably located on an inner lid 31 by means of a case 52. With the case 52, a ring shape case body 55 is provided on the lower face of an upper plate 54 which is engaged with a face of an upwardly directed recess 53 formed at the center of the inner lid 31. The upper plate 54 is secured by a screw 56 used to fasten a knob 32.

Consequently in using the third embodiment, at first the knob 32 and the screw 56 are removed, and the case 52 of the heat retaining material 51 detached from the inner lid 31. The heat retaining material 51 is then heated in a microwave oven. After this, the case 52 is reattached to the inner lid 31 by the screw 56. By attaching the heat retaining material 51 to inside of the inner lid 31 in this way, then a temperature drop inside a cooking pot 24 housed inside the insulated container 1, can be directly prevented by radiation from the heat retaining material 51. Moreover, by enclosing the heat retaining material 51 in the case 52 and attaching the case 52 using the knob 32 and the screw 56, then the heat retaining material 51 can be positively attached with good safety. Now with the third embodiment also, the thickness of the lower face of the case 52 is made thinner than that at other locations so that heat radiation can be efficiently directed to inside of the cooking pot 24.

Figure 9:
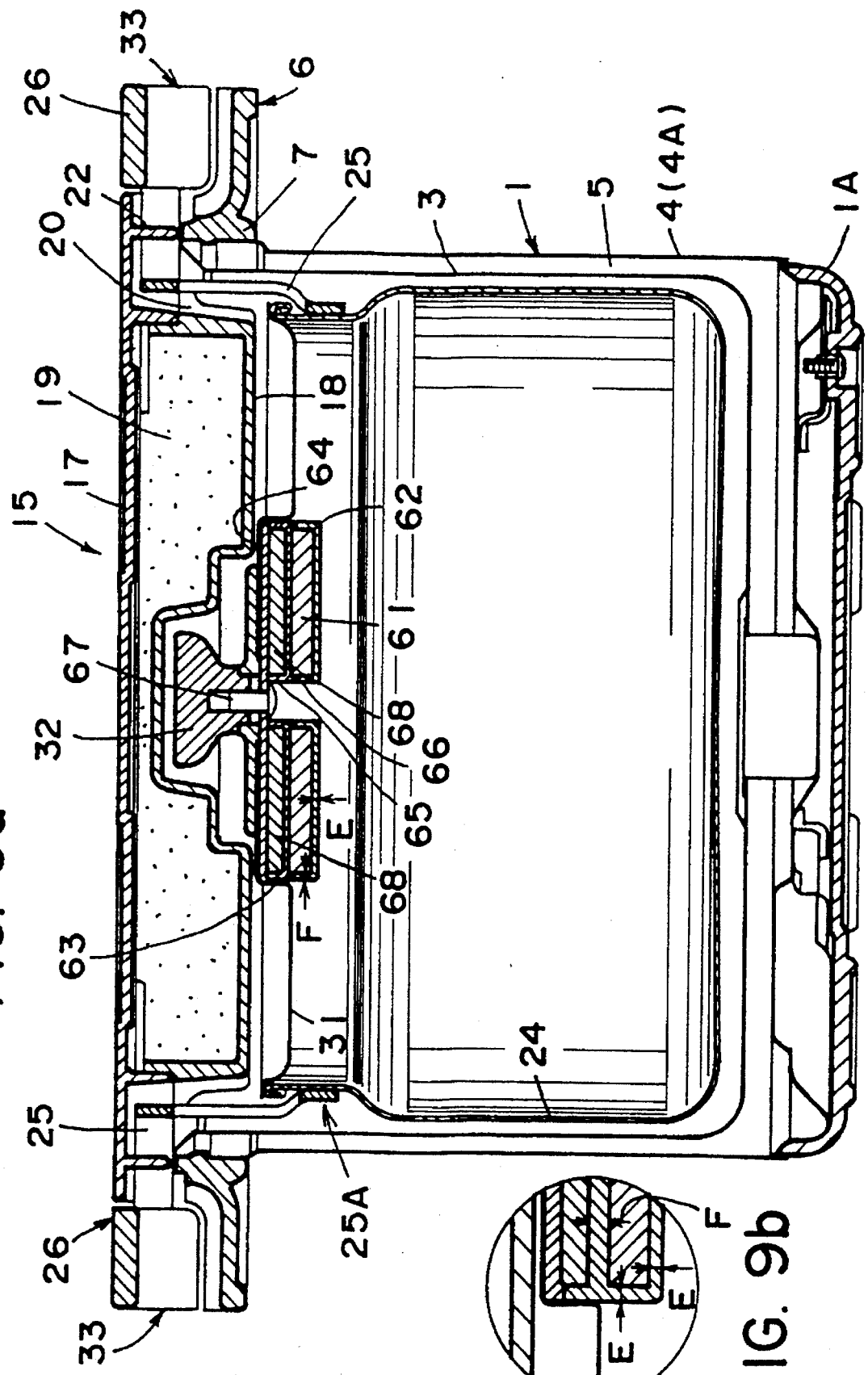
FIGS 9a and 9b are a cross-sectional view and an enlarged portion of a cross-sectional view showing a fourth embodiment of the present invention.
Figure 10:
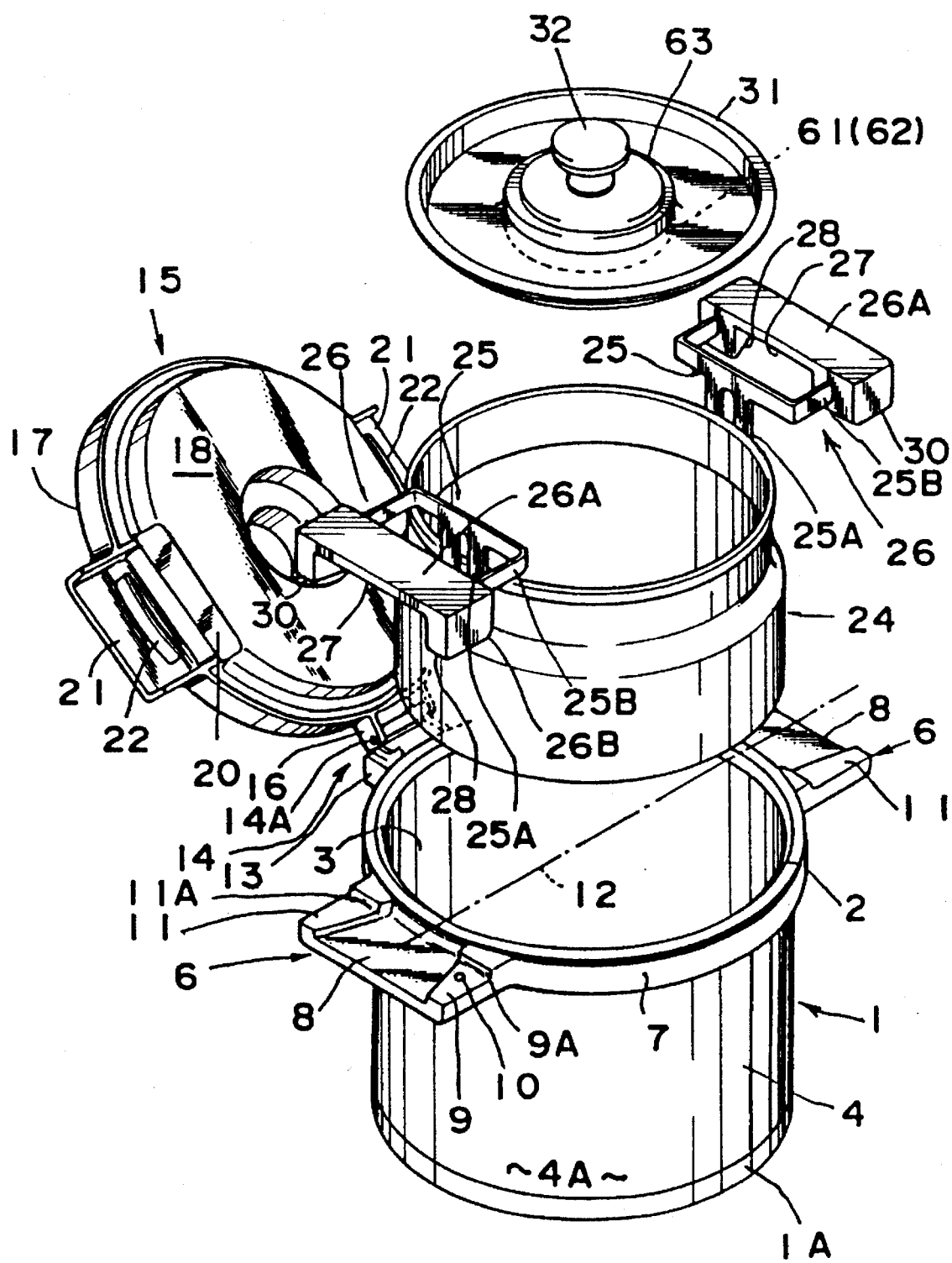
FIG. 10 is an exploded perspective view of the fourth embodiment.

FIGS. 9a, 9b and 10 show a fourth embodiment. A heat retaining material 61 provided on an inner lid 31 is removably located thereon by means of a case 62. With the case 62, two ring shape case bodies 65, 66 are connected together and attached to the lower face of an upper plate 64 which is engaged with a face of an upwardly directed recess 63 formed at the center of the inner lid 31. The upper plate 64 is secured by a screw 67 used to fasten a knob 32. An insulating material 68 is enclosed within the upper case body 65, while the heat retaining material 61 is enclosed within the lower case body 66.

Consequently in using the fourth embodiment, as with the third embodiment, at first the knob 32 and the screw 67 are removed, and the case 62 detached from the inner lid 31. The heat retaining material 61 is then heated in a microwave oven. After this, the case 62 is reattached to the inner lid 31 by the screw 67. By attaching the heat retaining material 61 to inside of the inner lid 31 in this way, then a temperature drop inside a cooking pot 24 housed inside the insulated container 1, can be directly prevented by radiation from the heat retaining material 61.

Furthermore, with the case 62, by providing the upper case body 65 on top of the lower case body 66 enclosing the heat retaining material 61, and enclosing the insulation material 68 thereinside, then heat transfer from the heat retaining material 61 to the inner lid 31 can be prevented, and the heat from the heat retaining material 61 can be efficiently radiated towards the cooking pot 24 and the insulated container 1. Moreover, the case 62 in which the heat retaining material 61 is enclosed can be positively attached with good safety to the inner lid 31 using the screw 67. Now with the fourth embodiment also, a thickness E of the lower and side faces of the case 62 is formed thinner than a thickness F of the upper face (E<F), so that heat radiation can be efficiently directed to inside the cooking pot 24, and the insulation characteristics thus improved.

Figure 11:
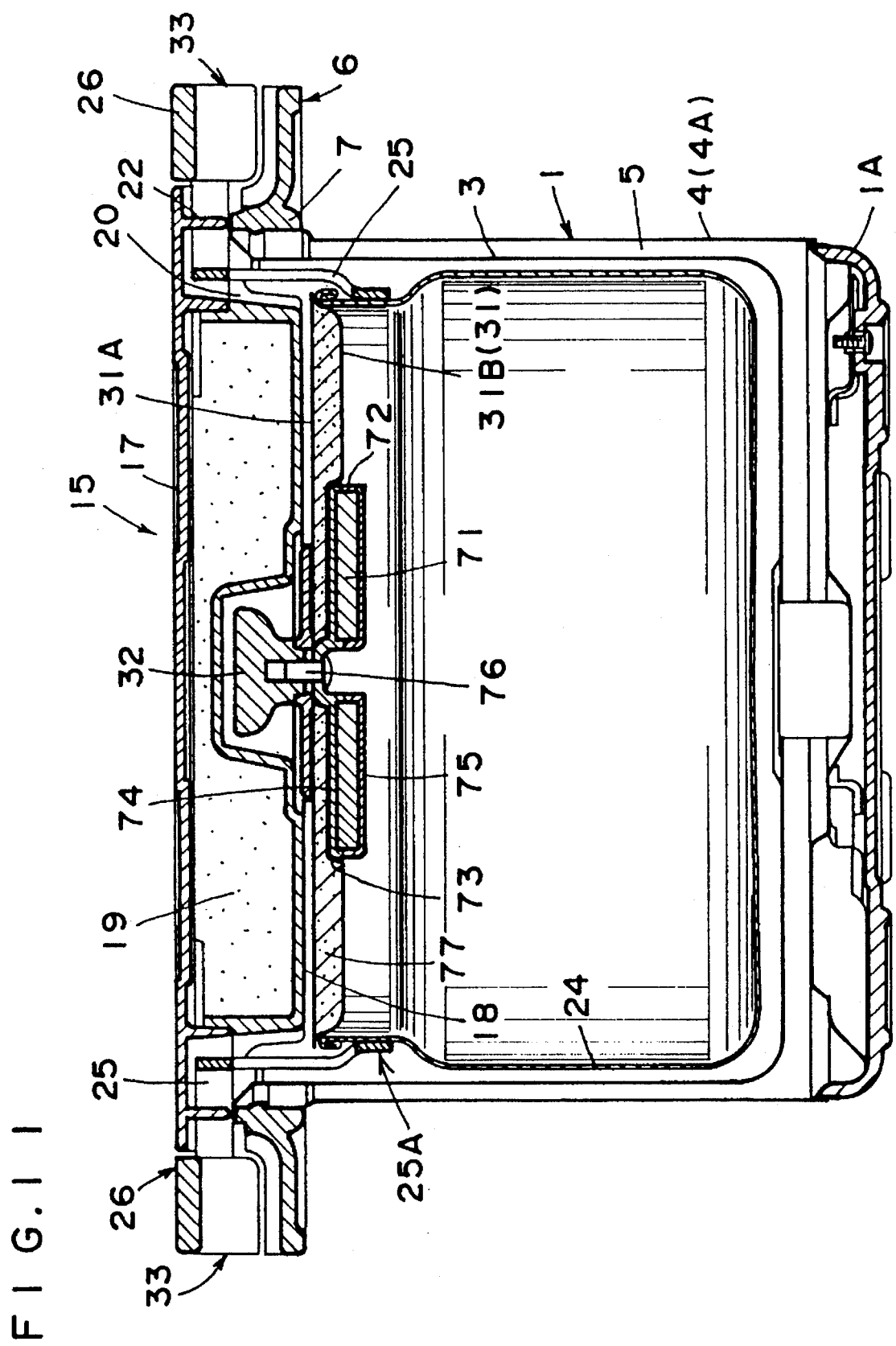
FIG. 11 is a cross-sectional view showing a fifth embodiment of the present invention.
Figure 12:
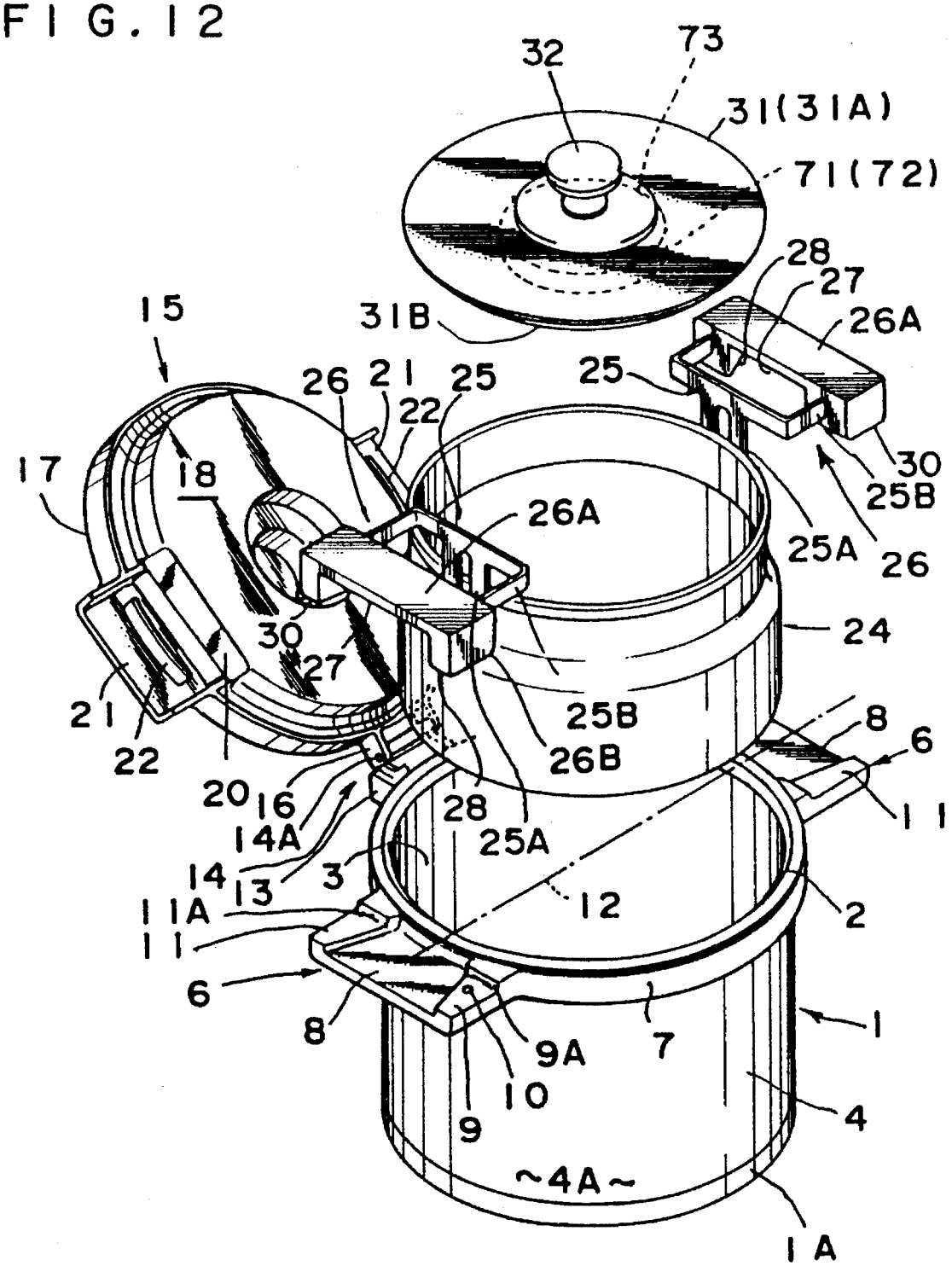
FIG. 12 is an exploded perspective view of the fifth embodiment.

FIGS. 11 and 12 show a fifth embodiment. A heat retaining material 71 is removably located on an inner lid 31 by means of a case 72. With the case 72, a ring shape case body 75 is provided on the lower face of an upper plate 74 which is engaged with a face of an upwardly directed recess 73 formed at the center of the inner lid 31. The upper plate 74 is secured by a screw 76 used to fasten a knob 32. Furthermore, the inner lid 31 comprises an inner lid lower plate 31B provided beneath an inner lid upper plate 31A, with a thermal insulation material 77 enclosed therebetween.

Consequently in using the fifth embodiment, at first the knob 32 and the screw 76 are removed, and the case 72 of the heat retaining material 71 detached from the inner lid 31. The heat retaining material 71 is then heated in a microwave oven. After this, the case 72 is reattached to the inner lid 31 by the screw 76. By attaching the heat retaining material 71 to inside of the inner lid 31 in this way, then a temperature drop inside a cooking pot 24 housed inside the insulated container 1, can be directly prevented by radiation from the heat retaining material 71. Moreover, the case 72 in which the heat retaining material 71 is enclosed can be positively attached with good safety using the knob 32 and the screw 76.

Furthermore, since the thermal insulation material 77 is provided in the inner lid 31, then the heat retaining performance of the cooking pot 24 itself can be improved, and this is further improved since conduction of heat from the heat retaining material 71 to the outside via the inner lid 31 is prevented. With the fifth embodiment also, the thickness of the upper face of the case 72 can be made thick to retain the thermal insulation properties, with the lower and side faces made thin so that heat radiation can be efficiently directed to inside of the cooking pot 24.

Figure 13:
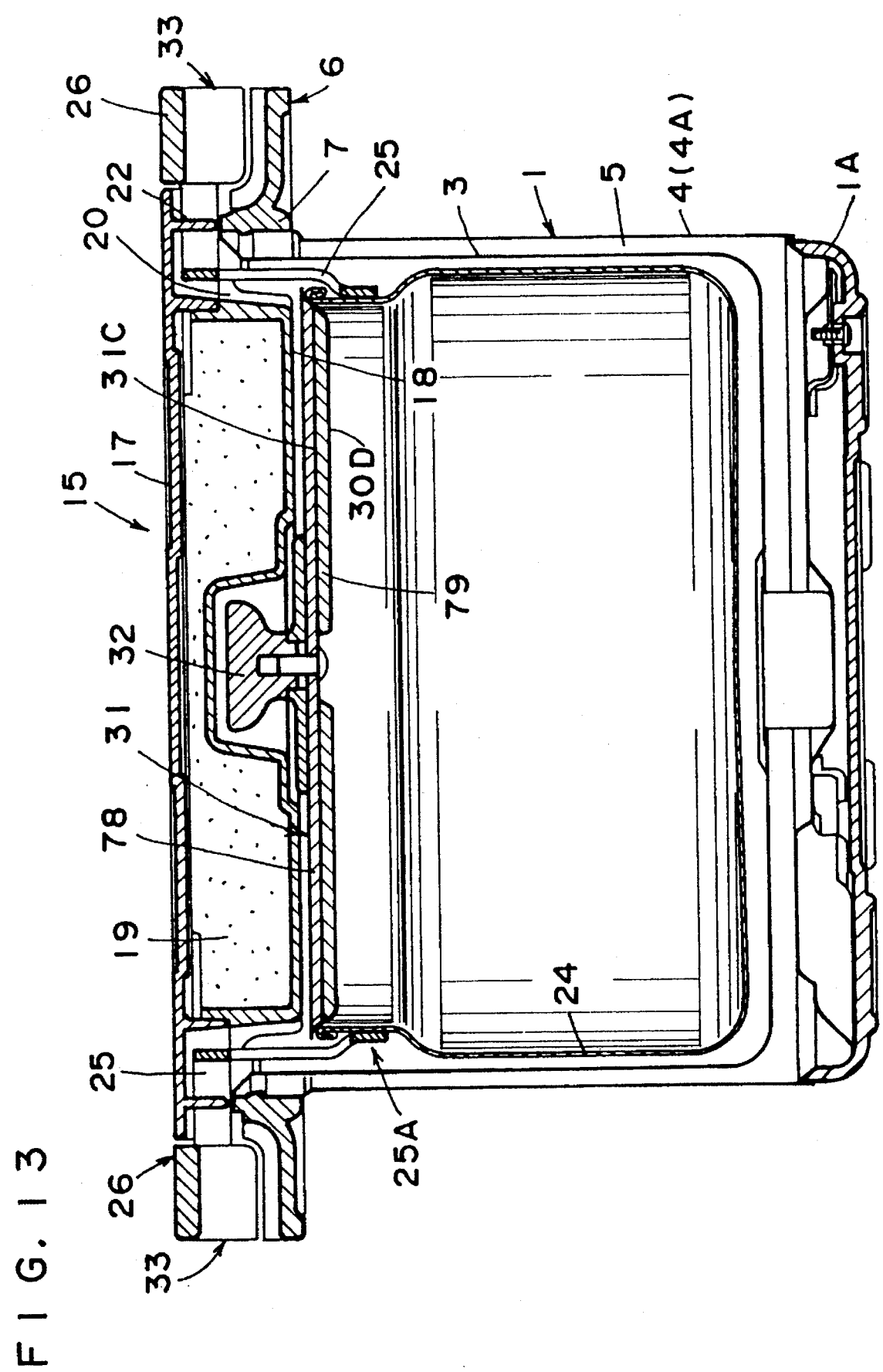
FIG. 13 is a cross-sectional view showing a sixth embodiment of the present invention.
Figure 14:
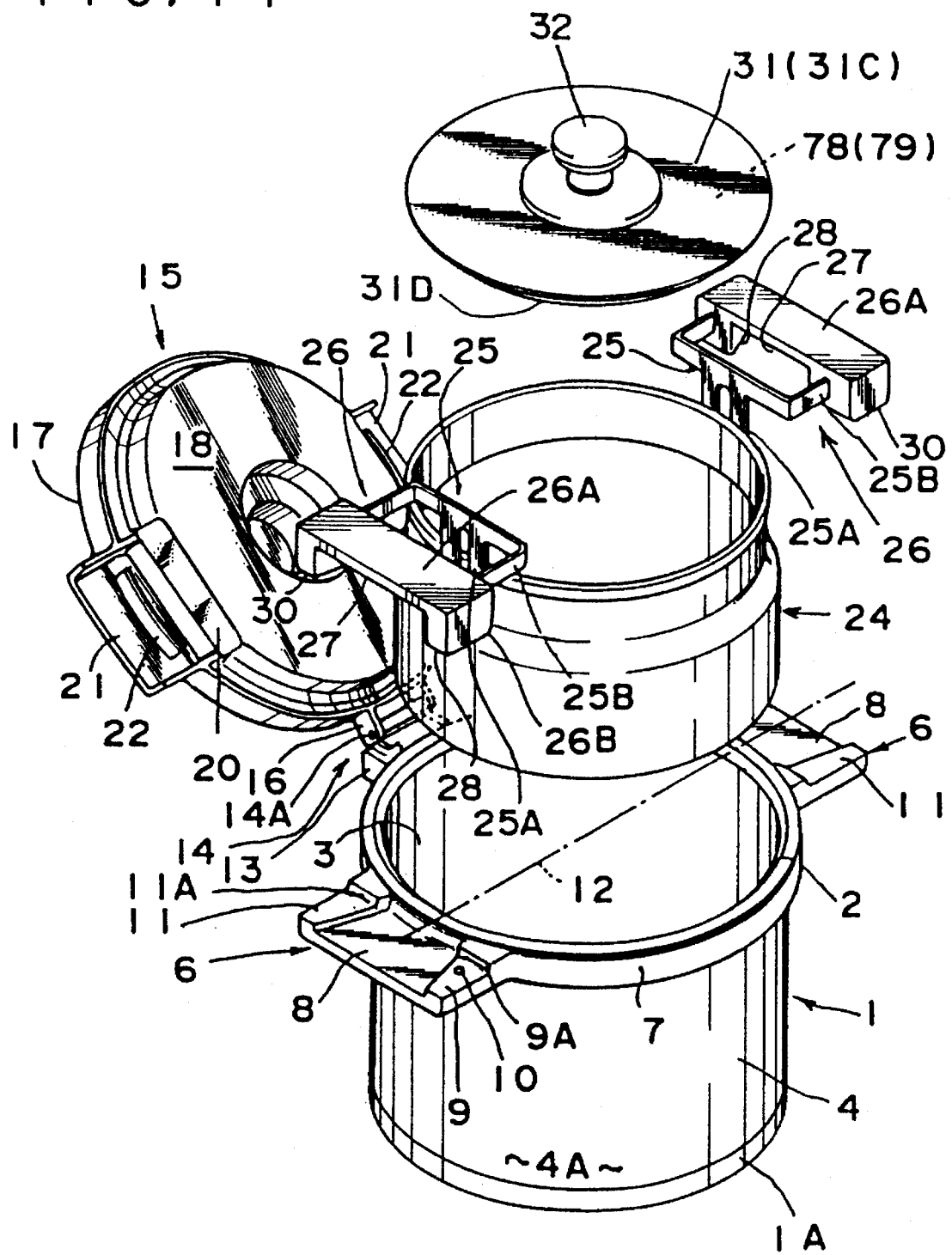
FIG. 14 is an exploded perspective view of the sixth embodiment.

FIGS. 13 and 14 show a sixth embodiment. With the sixth embodiment an inner lid 31 comprises; an inner lid lower plate 30D provided beneath an inner lid upper plate 31C, with an insulating material 78 enclosed in the upper portion of a space between the inner lid upper plate 31C and the inner lid lower plate 30D, and a heat retaining material 79 enclosed in the lower portion of the space. For the inner lid upper plate 31C and the inner lid lower plate 30D, a material which is resistant to high temperatures, and transparent to microwaves, such as glass or synthetic resin is used.

Consequently, in using the sixth embodiment, the inner lid 31 is inserted beforehand into a microwave oven and the heat retaining material 79 heated. A cooking pot 24 is then placed in the insulated container 1, and the inner lid 31 fitted to the cooking pot 24. Due to the double layer construction of the inner lid 31, with the heat retaining material 79 enclosed inside, then the heat retaining performance of the cooking pot 24 itself can be improved.

Furthermore since the top of the heat retaining material 79 is insulated by having the heat retaining material 79 in the lower portion of the double layer construction inner lid 31, and the insulating material 78 in the upper portion, then the cooking pot 24 can be effectively kept warm by the heat from the heat retaining material 79. Moreover, since the heat retaining material 79 is enclosed inside the inner lid 31 itself, the heat retaining material 79 can be attached with safety.

Figure 15:
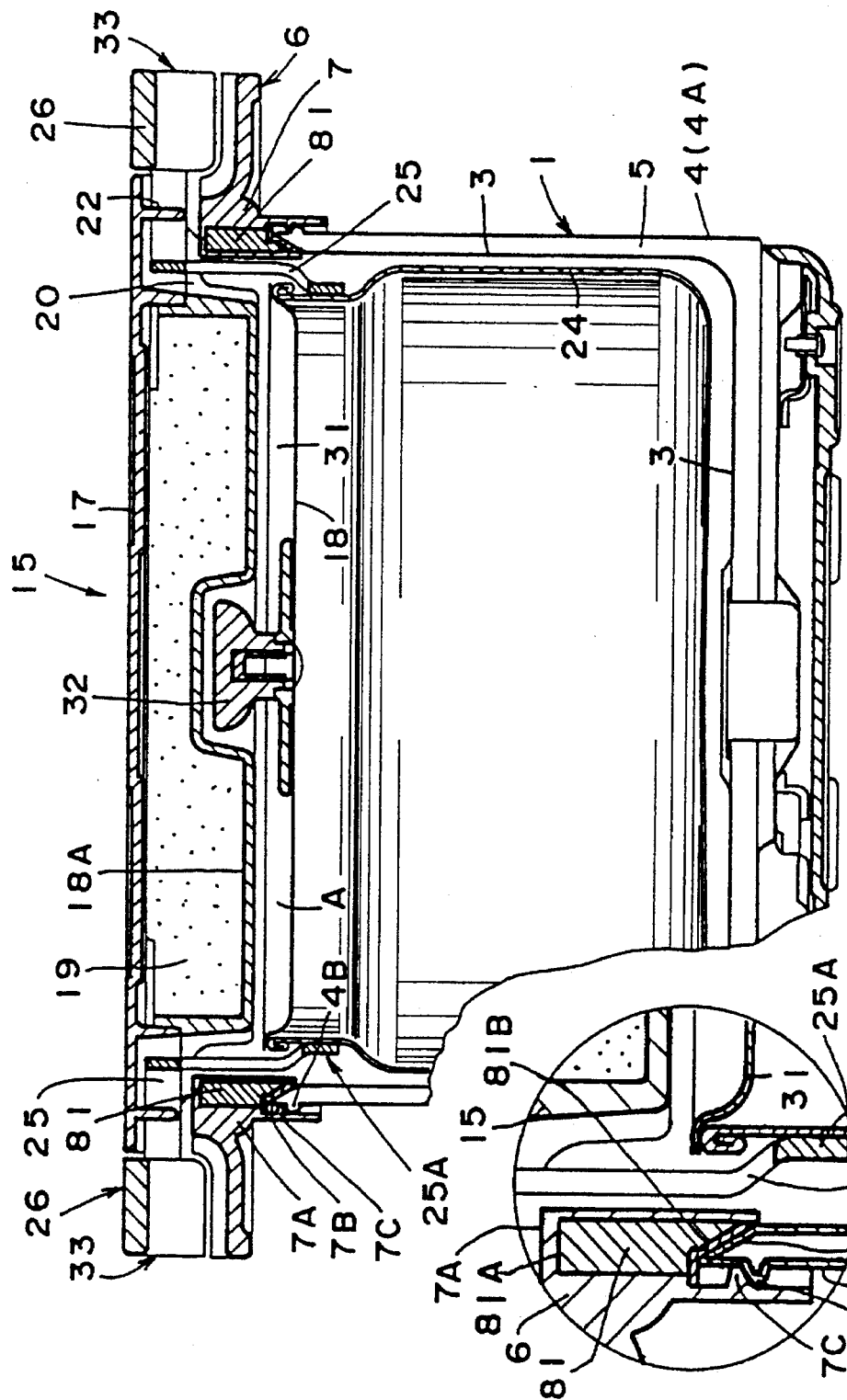
FIGS. 15a and 15b are a cross-sectional view and an enlarged portion of a cross-sectional view showing a seventh embodiment of the present invention.
Figure 16:
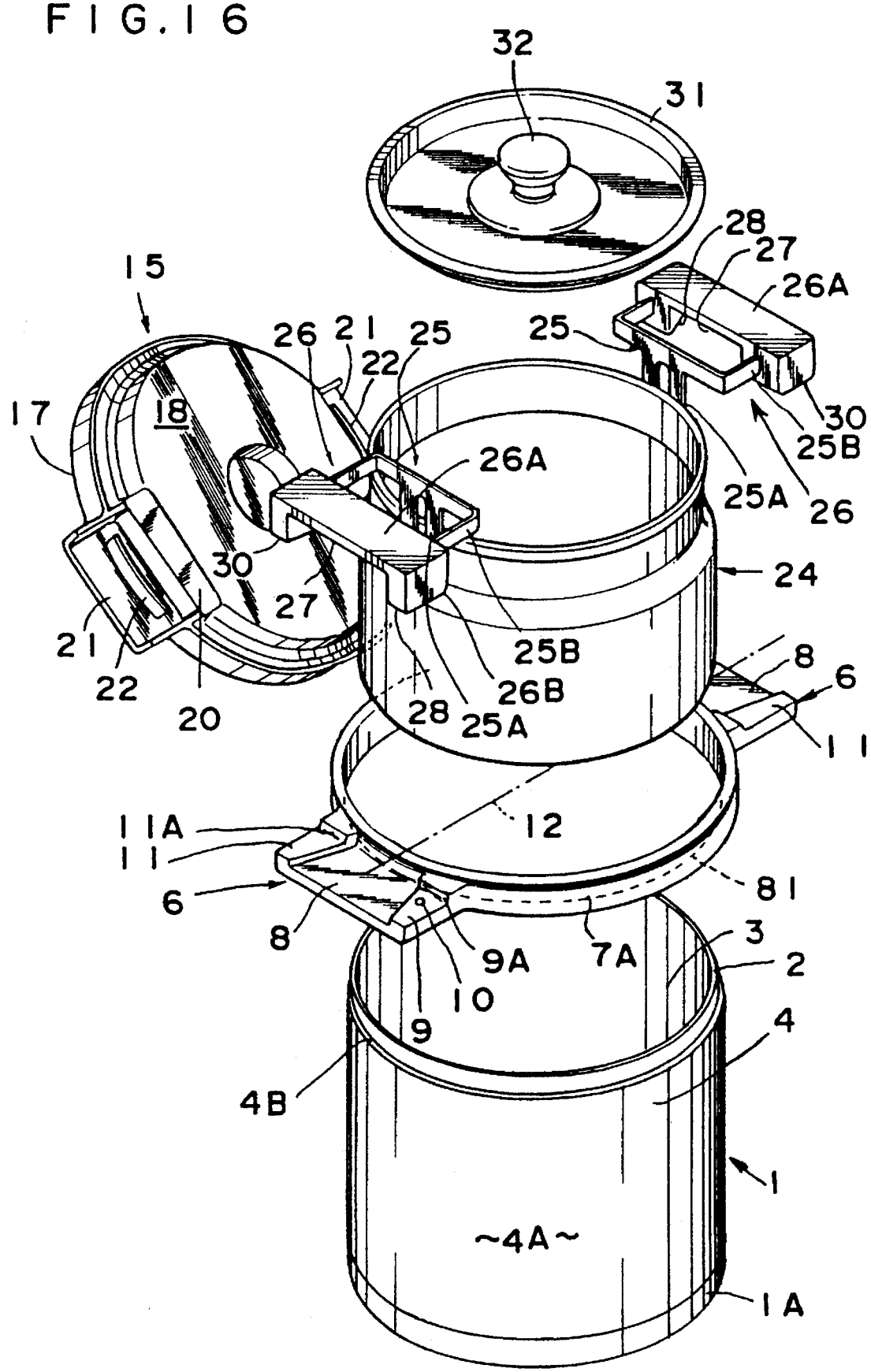
FIG. 16 is an exploded perspective view of the seventh embodiment.

FIGS. 15a, 15b and 16 show a seventh embodiment. With the seventh embodiment, a heat retaining material 81 is enclosed inside a ring shape shoulder member 7A having excellent heat resistance (made for example from synthetic resin, glass or stainless steel), which is removably engaged with an upper portion of an outer peripheral face 4A of an outer container 4 of an insulated container 1. In the case of stainless steel, this may be coated with synthetic resin or glass and the like. The shoulder member 7A, which is provided on opposite sides with first handgrips 6A, has a groove 7B formed on a lower face thereof, for engaging with an opening portion 2 of the insulated container 1. A protrusion 7C is formed on the inside of the groove 7B, and a protrusion 4B for engaging with the protrusion 7C is formed on the outer container 4. The heat retaining material 81 is enclosed in a ring shape groove 81A formed above the groove 7B, and sealed by a lower cover 81B which abuts with the opening portion 2. The groove 81A is positioned so that the heat retaining material 81 is located above the opening portion 2. With the seventh embodiment, an insulated outer lid 15 is not connected to the shoulder member by a hinge as with the abovementioned embodiments, but is used as a single body.

Consequently, in using the seventh embodiment, the shoulder member 7A is removed beforehand from the outer container 4, and inserted into a microwave oven to heat the heat retaining material 81 by microwave radiation. The heated shoulder member 7A is then engaged in the opening portion 2 by means of the protrusion 4B and the protrusion 7C, after which a cooking pot 24 is placed in the insulated container 1, and the insulated outer lid 15 closed. In this condition, there is the tendency for a drop in internal temperature due to heat conduction at the opening portion 2 of the insulated container 1. However since the heat retaining material 81 is provided at the opening portion 2, this prevents the temperature drop at this location so that the insulated container 1 can be kept warm.

Since the heat retaining material 81 is provided at the opening portion 2 by means of the shoulder member 7A, then the heat retaining material 81 can be positively attached to the opening portion 2 with good safety, and the insulated container 1 kept warm.

Figure 17:
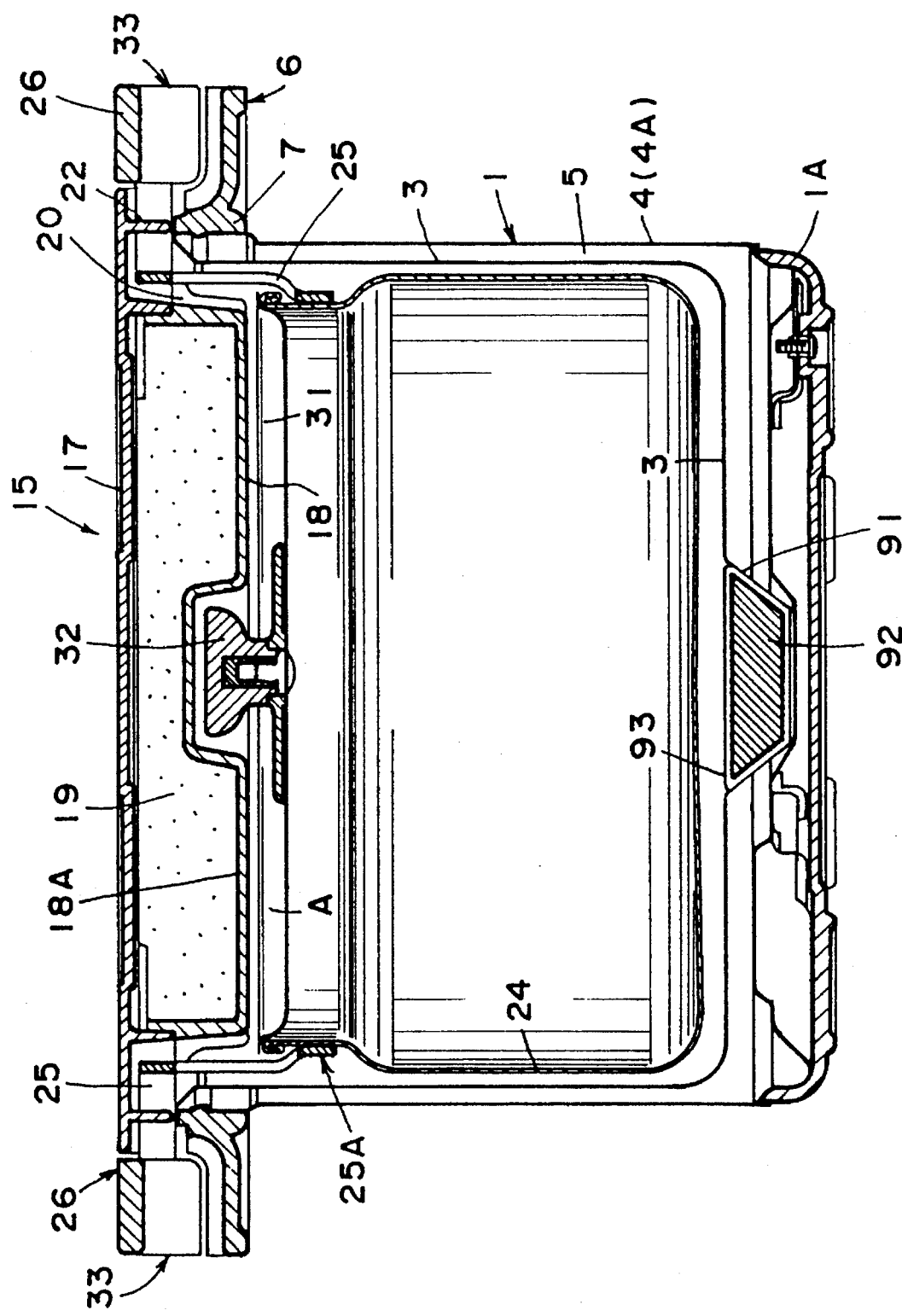
FIG. 17 is a cross-sectional view showing an eighth embodiment of the present invention.
Figure 18:
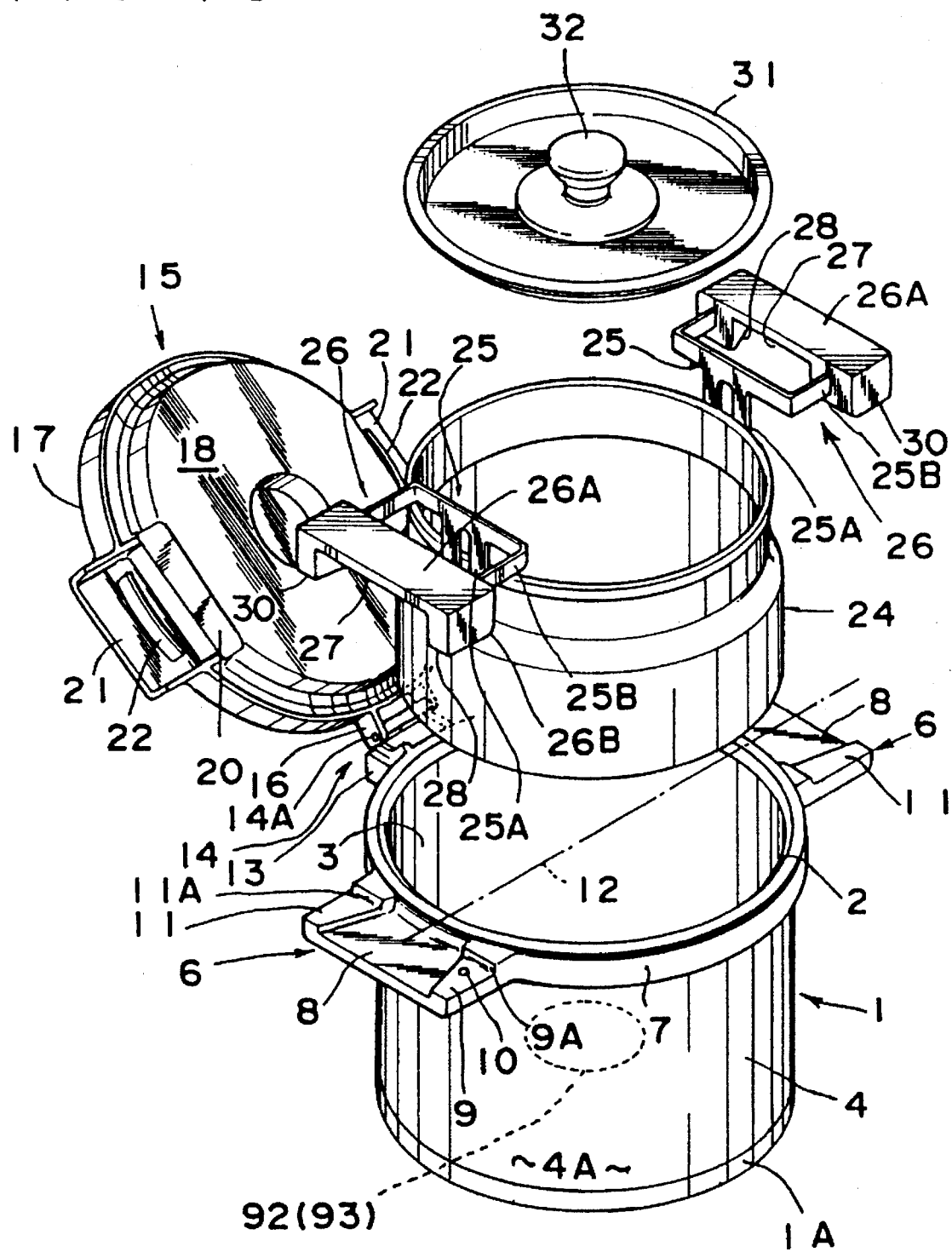
FIG. 18 is an exploded perspective view of the eighth embodiment.

FIGS. 17 and 18 show an eighth embodiment. With the eighth embodiment, a conical frustum shape recess 91 is formed in a central bottom portion of an inner container 3 of an insulated container 1, and a heat retaining material 92 is provided in the recess 91. The heat retaining material 92 is enclosed within a case 93, which is formed in a conical frustum shape so as to engage with the recess 91. Moreover, an upper face of the case 93 is provided at a location approximately in line with or slightly lower than the bottom face of the inner container 3.

Consequently, in using the eighth embodiment, the heat retaining material 92 enclosed in the case 93 is preheated in a microwave oven, and then located in the recess portion 91. After this, a cooking pot 24 and the insulated outer lid 15 etc. are fitted. In this way, by forming the recess 91 in the bottom of the inner container 3, and then locating the case 93 in which the heat retaining material 92 is enclosed in the recess 91, then a temperature drop inside the insulated container 1 can be prevented. Moreover, the heat retaining material 92 enclosed in the case 93 can be safely fitted. Furthermore, since the upper face of the case 93 is provided at a location approximately in line with or slightly lower than the bottom face of the inner container 3, then the space for accommodating the cooking pot 24 can be maintained. Now with the eighth embodiment also, the thickness of the upper face of the case 93 is formed thinner than that at other locations so that heat radiation can be efficiently directed to inside of the insulated container 1.

Figure 19:
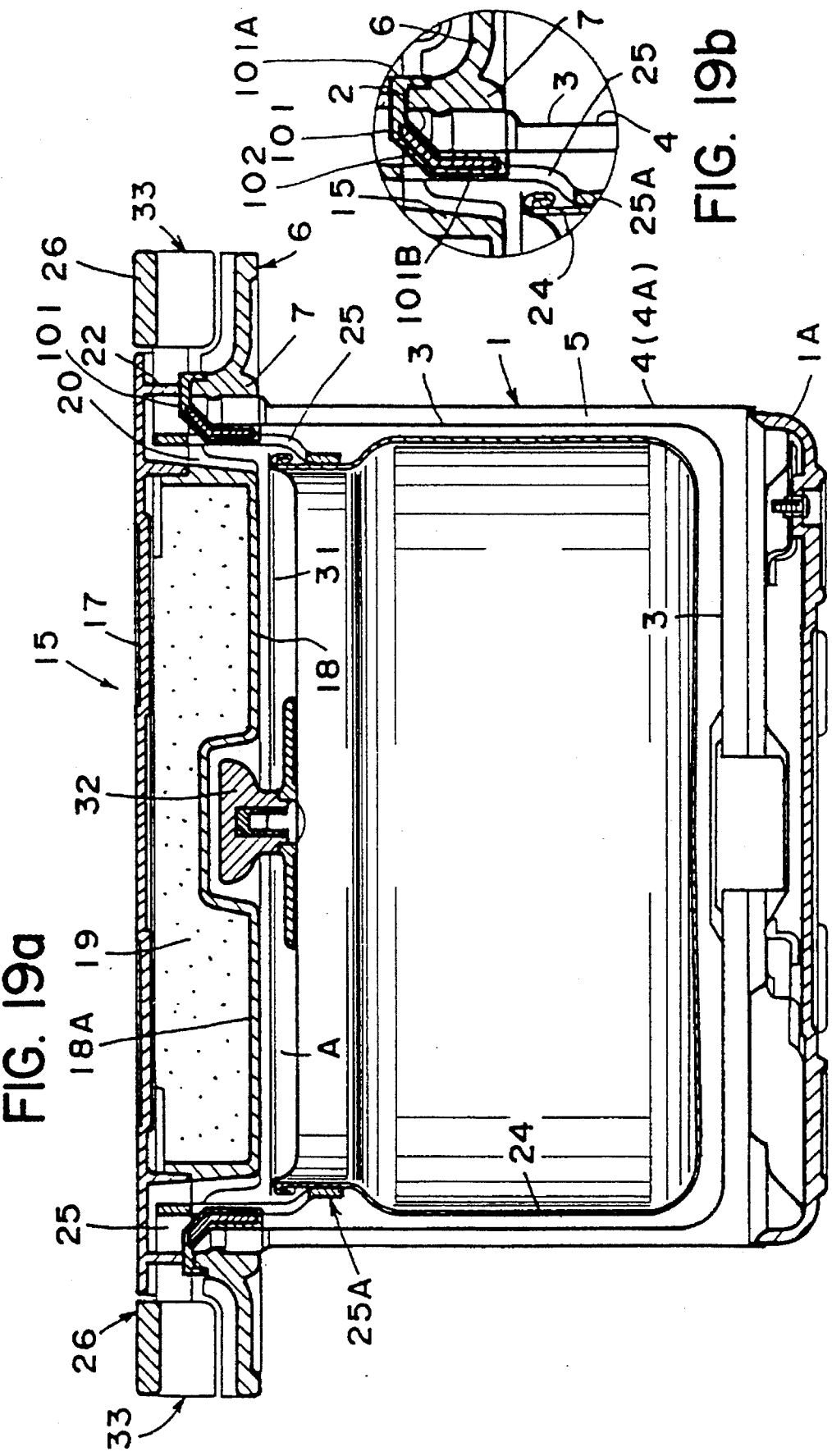
FIGS. 19a and 19b are a cross-sectional view and an enlarged portion of a cross-sectional view showing a ninth embodiment of the present invention.
Figure 20:
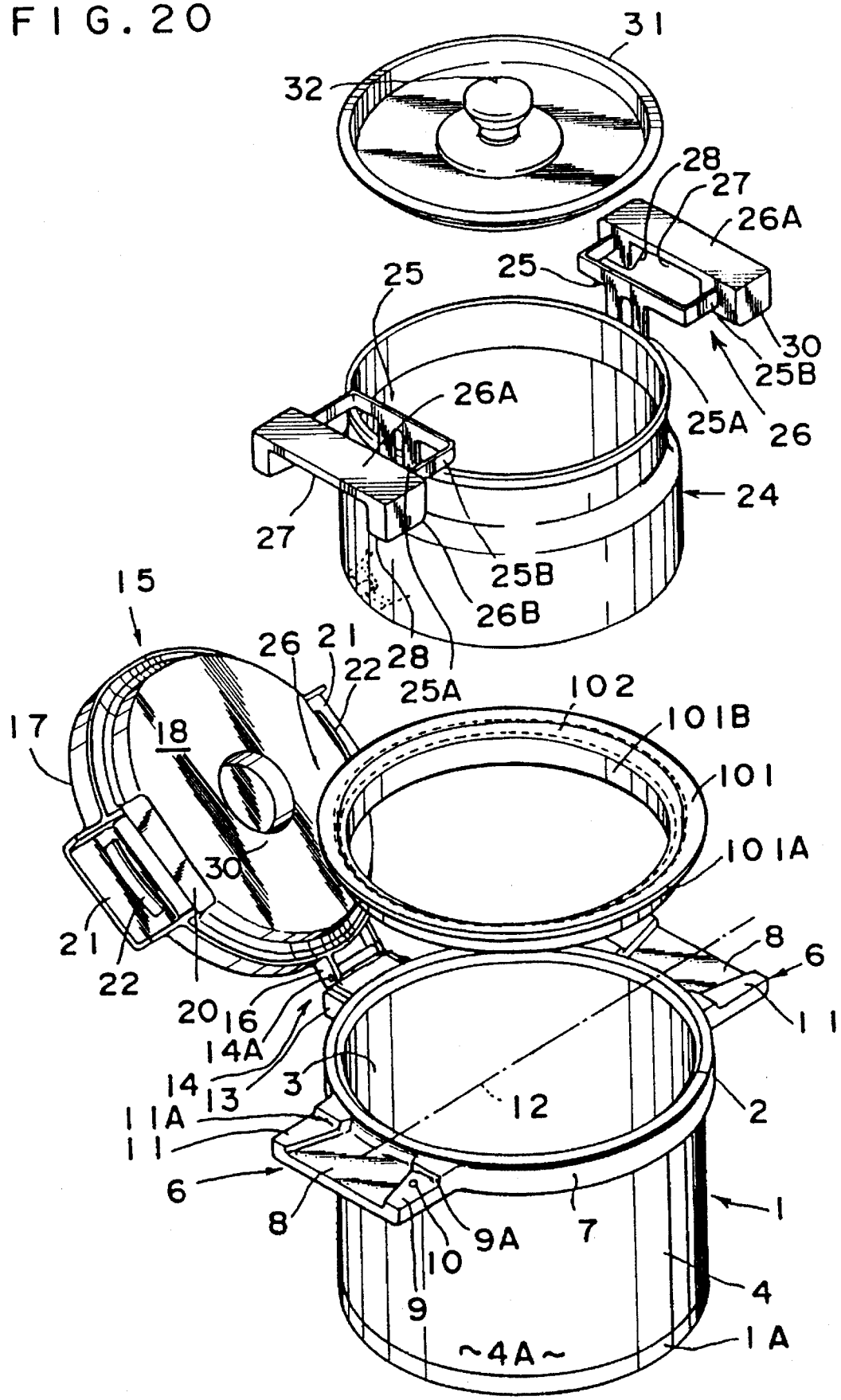
FIG. 20 is an exploded perspective view of the ninth embodiment.

FIGS. 19a, 19b and 20 show a ninth embodiment. With the ninth embodiment, a ring shape opening cover 101 is removably provided so as to cover an opening portion 2 of an inner container 3 and an outer container 4 of an insulated container 1. The opening cover 101 is made from a heat resistant material such as synthetic resin or glass, with a heat retaining material 102 which can be heated by microwaves enclosed thereinside. An outer end portion 101A of the opening cover 101 is engaged with a shoulder member 7, while an inner end portion 101B is engaged with the inner container 3.

Consequently, in using the ninth embodiment, the opening cover 101 is removed beforehand from the shoulder member 7, and inserted into a microwave oven, to heat the heat retaining material 102 by microwave radiation. The heated opening cover 101 is then located on the opening portion 2, after which a cooking pot 24 is placed in the insulated container 1, and an insulated outer lid 15 closed. In this condition, there is the tendency for a drop in internal temperature due to heat conduction at the opening portion 2 of the insulated container 1. However since the heat retaining material 102 is provided at the opening portion 2, this prevents the temperature drop at this location so that the insulated container 1 can be kept warm.

Since the heat retaining material 102 is provided inside the opening cover 101 in this way, then the temperature drop inside the insulated container 1 can be positively prevented by the heat retaining material 102. Moreover, with the opening cover 101, since the outer end portion 101A is engaged with the shoulder member 7, while the inner end portion 101B is engaged with the inner container 3, then this can be fitted safely. Furthermore, with the ninth embodiment, since the opening cover 101 which covers only the opening portion 2 is comparatively small, it can be easily handled. With the ninth embodiment also, the thickness of the inner side(that is to say the cooking pot 24 side) of the opening cover 101 in which the heat retaining material 102 is enclosed, can be made thinner than that of the outer side.

With the first aspect of the invention, there is provided a thermally insulated cooking device comprising; an insulated container, a cooking pot suspended in space inside the insulated container, an insulated outer lid which is able to close off an upper opening of the insulated container, and an inner lid for closing off an upper opening of the cooking pot, wherein a heat retaining material which can be heated by microwaves is removably provided on an inner face of the insulated outer lid. With this construction, by attaching the heat retaining material which has been heated in a microwave oven and the like, to the insulated outer lid, the heat retaining material can safely prevent a temperature drop inside the insulated container, and can also be safely attached.

With the second aspect of the invention, there is provided a thermally insulated cooking device comprising; an insulated container, a cooking pot suspended in space inside the insulated container, an insulated outer lid which is able to close off an upper opening of the insulated container, and an inner lid for closing off an upper opening of the cooking pot, wherein a heat retaining material which can be heated by microwaves is removably provided on an inner face of the inner lid. With this construction, by attaching the heat retaining material which has been heated in a microwave oven and the like to the inner lid, then a temperature drop inside the cooking pot can be prevented, and the heat retaining material can be safely attached.

With the third aspect of the invention, there is provided a thermally insulated cooking device comprising; an insulated container, a cooking pot suspended in space inside the insulated container, an insulated outer lid which is able to close off an upper opening of the insulated container, and an inner lid for closing off an upper opening of the cooking pot, wherein a hollow region is provided in the inner lid, and a heat retaining material which can be heated by microwaves is provided in the hollow region, and the heat retaining material is heated by irradiating the inner lid with microwaves. With this construction, by attaching the inner lid together with the heat retaining material which has been heated in a microwave oven and the like, to the cooking pot, then a temperature drop inside the cooking pot can be prevented, and the heat retaining material can be safely attached.

With the fourth aspect of the invention, there is provided a thermally insulated cooking device comprising; an insulated container with a shoulder member provided on an upper opening thereof, a cooking pot suspended in space inside the insulated container, an insulated outer lid which is able to close off the upper opening of the insulated container, and an inner lid for closing off an upper opening of the cooking pot, wherein the shoulder member is removably provided on the insulated container, and a heat retaining material which can be heated by microwaves is provided in the shoulder member, and the heat retaining material is heated by irradiating the shoulder member with microwaves. With this construction, by attaching the shoulder member together with the heat retaining material which has been heated in a microwave oven and the like, to the insulated container, then a temperature drop inside the insulated container can be prevented, and the heat retaining material can be safely attached.

With the fifth aspect of the invention, there is provided a thermally insulated cooking device comprising; an insulated container, a cooking pot suspended in space inside the insulated container, an insulated outer lid which is able to close off an upper opening of the insulated container, and an inner lid for closing off an upper opening of the cooking pot, wherein a recess portion is formed in a bottom portion of an inner container of the insulated container, and a heat retaining material which can be heated by microwaves is removably provided in the recess portion. With this construction, by locating the heat retaining material which has been heated in a microwave oven and the like in the recess, then a temperature drop inside the insulated container can be prevented, and the heat retaining material can be safely located.

With the sixth aspect of the invention, there is provided a thermally insulated cooking device comprising; an insulated container, a cooking pot suspended in space inside the insulated container, an insulated outer lid which is able to close off an upper opening of the insulated container, and an inner lid for closing off an upper opening of the cooking pot, wherein a heat retaining material which can be heated by microwaves is removably provided at the upper opening, and the heat retaining material is heated by irradiation with microwaves. With this construction, by fitting the heat retaining material which has been heated in a microwave oven and the like, to the insulated container, then a temperature drop inside the insulated container can be prevented.

The present invention is not limited to the abovementioned embodiments, and various modifications can be made thereto.

What is claimed is:

1. A thermally insulated cooking device comprising; an insulated container, a cooking pot suspended in space inside the insulated container, an insulated outer lid which is able to close off an upper opening of said insulated container, and an inner lid for closing off an upper opening of said cooking pot, wherein a heat retaining material which can be heated by microwaves is removably provided on an inner face of said insulated outer lid.

2. A thermally insulated cooking device comprising; an insulated container, a cooking pot suspended in space inside the insulated container, an insulated outer lid which is able to close off an upper opening of said insulated container, and an inner lid for closing off an upper opening of said cooking pot, wherein a heat retaining material which can be heated by microwaves is removably provided on an inner face of said inner lid.

3. A thermally insulated cooking device comprising; an insulated container, a cooking pot suspended in space inside the insulated container, an insulated outer lid which is able to close off an upper opening of said insulated container, and an inner lid for closing off an upper opening of said cooking pot, wherein a hollow region is provided in said inner lid, and a heat retaining material which can be heated by microwaves is provided in said hollow region, and said heat retaining material is heated by irradiating said inner lid with microwaves.

4. A thermally insulated cooking device comprising; an insulated container with a shoulder member provided on an upper opening thereof, a cooking pot suspended in space inside the insulated container, an insulated outer lid which is able to close off the upper opening of said insulated container, and an inner lid for closing off an upper opening of said cooking pot, wherein said shoulder member is removably provided on said insulated container, and a heat retaining material which can be heated by microwaves is provided in said shoulder member, and said heat retaining material is heated by irradiating said shoulder member with microwaves.

5. A thermally insulated cooking device comprising; an insulated container, a cooking pot suspended in space inside the insulated container, an insulated outer lid which is able to close off an upper opening of said insulated container, and an inner lid for closing off an upper opening of said cooking pot, wherein a recess portion is formed in a bottom portion of an inner container of said insulated container, and a heat retaining material which can be heated by microwaves is removably provided in said recess portion.

6. A thermally insulated cooking device comprising; an insulated container, a cooking pot suspended in space inside the insulated container, an insulated outer lid which is able to close off an upper opening of said insulated container, and an inner lid for closing off an upper opening of said cooking pot, wherein a heat retaining material which can be heated by microwaves is removably provided at said upper opening, and said heat retaining material is heated by irradiation with microwaves.

* * * * *

UNITED STATES PATENT AND TRADEMARK OFFICE
CERTIFICATE OF CORRECTION

PATENT NO. : 5,596,921

DATED : January 28, 1997

INVENTOR(S) : T. KUWANA et al.

It is certified that error appears in the above-indentified patent and that said Letters Patent is hereby corrected as shown below:

On the title page, in section [56], "References Cited", "FOREIGN PATENT DOCUMENTS", line 1, change "8/1961" to --- 8/1991---.

Signed and Sealed this

Fifteenth Day of April, 1997

*Attest:*

BRUCE LEHMAN

*Attesting Officer*    Commissioner of Patents and Trademarks